United States Patent
Namba et al.

(10) Patent No.: US 12,151,681 B2
(45) Date of Patent: Nov. 26, 2024

(54) VEHICLE DRIVING CONTROL SYSTEM

(71) Applicant: SUBARU CORPORATION, Tokyo (JP)

(72) Inventors: Ryosuke Namba, Tokyo (JP); Hajime Oyama, Tokyo (JP); Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 229 days.

(21) Appl. No.: 17/554,627

(22) Filed: Dec. 17, 2021

(65) Prior Publication Data

US 2022/0203980 A1  Jun. 30, 2022

(30) Foreign Application Priority Data

Dec. 28, 2020  (JP) .................. 2020-219595

(51) Int. Cl.
*B60W 30/14* (2006.01)
*B60W 30/16* (2020.01)
(Continued)

(52) U.S. Cl.
CPC ........ *B60W 30/146* (2013.01); *B60W 30/162* (2013.01); *B60W 30/18163* (2013.01);
(Continued)

(58) Field of Classification Search
CPC ......... B60W 30/146; B60W 30/18163; B60W 2556/45; B60W 2554/80; H04W 4/44
See application file for complete search history.

(56) References Cited

U.S. PATENT DOCUMENTS

2018/0065627 A1* 3/2018 Ohmura ................ B60W 30/08
2018/0370526 A1* 12/2018 Ohmura ................ G06V 20/584
(Continued)

FOREIGN PATENT DOCUMENTS

JP  2007-323117 A  12/2007
JP  2018-108768 A  7/2018
(Continued)

OTHER PUBLICATIONS

Office Action dated Aug. 6, 2024, from corresponding Japan Patent Application No. 2020-219595, 5 pages.

*Primary Examiner* — Todd Melton
*Assistant Examiner* — Jason R Roberson
(74) *Attorney, Agent, or Firm* — Rimon P.C.

(57) ABSTRACT

A vehicle driving control system includes a road map information updating unit, a control information calculation unit, and a driving control execution unit. Upon determining that a stopped vehicle is present ahead of a target vehicle and that the target vehicle is able to pass by the stopped vehicle, the control information calculation unit calculates control information to be used to restrict a vehicle speed to a first set vehicle speed or less until the target vehicle passes by the stopped vehicle, and calculates, if a door of the stopped vehicle has been opened, the control information to be used to restrict the vehicle speed to a second set vehicle speed or less until a set time period elapses from the opening of the door or until the target vehicle passes by the stopped vehicle. The second set vehicle speed is lower than the first set vehicle speed.

8 Claims, 22 Drawing Sheets

(51) Int. Cl.
*B60W 30/18* (2012.01)
*B60W 40/04* (2006.01)
*H04W 4/44* (2018.01)

(52) U.S. Cl.
CPC .............. *B60W 40/04* (2013.01); *H04W 4/44* (2018.02); *B60W 2554/80* (2020.02); *B60W 2556/40* (2020.02); *B60W 2556/45* (2020.02)

(56) References Cited

U.S. PATENT DOCUMENTS

| | | | |
|---|---|---|---|
| 2019/0121362 A1 | 4/2019 | Russell et al. | |
| 2019/0283671 A1* | 9/2019 | Shimomura | G08G 1/166 |
| 2020/0202209 A1* | 6/2020 | Mao | G06N 3/08 |
| 2020/0264630 A1 | 8/2020 | Sakurada | |
| 2020/0290607 A1* | 9/2020 | Mielenz | B60W 30/09 |
| 2020/0365012 A1* | 11/2020 | Zagajac | G08G 1/096783 |
| 2021/0009115 A1 | 1/2021 | Ohmura et al. | |
| 2021/0094577 A1* | 4/2021 | Shalev-Shwartz | G06V 40/10 |
| 2021/0188264 A1 | 6/2021 | Okuda et al. | |
| 2021/0309227 A1* | 10/2021 | Jang | B60W 40/04 |
| 2021/0325197 A1* | 10/2021 | Ohmura | B60W 50/0097 |
| 2022/0105942 A1* | 4/2022 | Aso | G06V 20/588 |
| 2023/0182775 A1* | 6/2023 | Beaurepaire | B60W 30/18163 701/26 |

FOREIGN PATENT DOCUMENTS

| | | |
|---|---|---|
| JP | 2019-142303 A | 8/2019 |
| JP | 2019-142318 A | 8/2019 |
| JP | 2019-142428 A | 8/2019 |
| JP | 2019-172113 A | 10/2019 |
| JP | 2020-135320 A | 8/2020 |
| JP | 2020-154532 A | 9/2020 |
| JP | 2020-154748 A | 9/2020 |
| WO | 2019/220717 A1 | 11/2019 |

* cited by examiner

| VEHICLE ID |
|---|
| DATE AND TIME |
| DISTANCE IMAGE |
| POSITION (LATITUDE AND LONGITUDE) |
| ACCELERATION RATE |
| VEHICLE SPEED |
| TRAVELING DIRECTION |
| ⋮ |
| DOOR SWITCH SIGNAL |
| ⋮ |

FIG. 4

| MONITORING APPARATUS ID |
|---|
| DATE AND TIME |
| IMAGE |
| POSITION (LATITUDE AND LONGITUDE) |
| ⋮ |

FIG. 5

VEHICLE DRIVING CONTROL SYSTEM

CROSS-REFERENCE TO RELATED APPLICATIONS

The present application claims priority from Japanese Patent Application No. 2020-219595 filed on Dec. 28, 2020, the entire contents of which are hereby incorporated by reference.

BACKGROUND

The technology relates to a vehicle driving control system configured to perform a driving control when a vehicle passes by a stopped vehicle.

To reduce the burden of a driver's driving operation and to improve safety, driving control apparatuses configured to assist the driver's driving operation have been put to practical use in recent vehicles such as automobiles. For this type of driving control apparatus, various techniques related to the following traveling control modes have been developed: a traveling control mode of performing a steering assist control and an acceleration or deceleration control assuming active driving operations performed by the driver; and a traveling control mode, i.e., an automatic driving mode, of causing the vehicle to travel without requiring the driver's driving operation. For example, reference is made to Japanese Unexamined Patent Application Publication No. 2019-172113.

The traveling control by the driving control apparatus is implemented by, for example, an adaptive cruise control (ACC) and a lane keep control, e.g., an active lane keep centering (ALKC) control. Such traveling control makes it possible to cause the vehicle to travel automatically along a traveling lane, while keeping a distance between the vehicle and a preceding vehicle.

The driving control apparatus uses a technique of, upon recognizing an obstacle ahead of the own vehicle by a traveling environment recognition apparatus, performing an emergency braking control, e.g., an autonomous emergency braking (AEB) control, for the obstacle to perform deceleration until a relative speed between the own vehicle and the obstacle becomes zero. The traveling environment recognition apparatus includes an autonomous sensor, such as a camera or a radar. Examples of the obstacle include a vehicle and a pedestrian.

SUMMARY

An aspect of the technology provides a vehicle driving control system includes a road map information updating unit, a control information calculation unit, and a driving control execution unit. The road map information updating unit is configured to update road map information in real time, on the basis of road traffic information, mobile body information, or both collected from a mobile body by wireless communication. The control information calculation unit is configured to calculate control information for a vehicle on the basis of the road map information. The driving control execution unit is configured to perform a driving control of the vehicle on the basis of the control information. The control information calculation unit is configured to calculate, in a case where the control information calculation unit determines, on the basis of the road map information, that a stopped vehicle is present within a set distance ahead of a target vehicle and that the target vehicle is able to pass by the stopped vehicle, the control information to be used to restrict a vehicle speed of the target vehicle to equal to or less than a first set vehicle speed until the target vehicle passes by the stopped vehicle. The control information calculation unit is configured to calculate, in a case where the control information calculation unit determines, on the basis of the road map information, that the stopped vehicle is present within the set distance ahead of the target vehicle and that the target vehicle is able to pass by the stopped vehicle, and where a door of the stopped vehicle has been opened, the control information to be used to restrict the vehicle speed to equal to or less than a second set vehicle speed until a set time period elapses from the opening of the door or until the target vehicle passes by the stopped vehicle. The second set vehicle speed is lower than the first set vehicle speed.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 4 is an explanatory diagram illustrating road-traffic detection information and vehicle detection information that are transmitted from the vehicle driving control apparatus according to one example embodiment of the technology.

FIG. 5 is an explanatory diagram illustrating road-traffic detection information that is transmitted from the monitoring apparatus according to one example embodiment of the technology.

DETAILED DESCRIPTION

Figure 1:
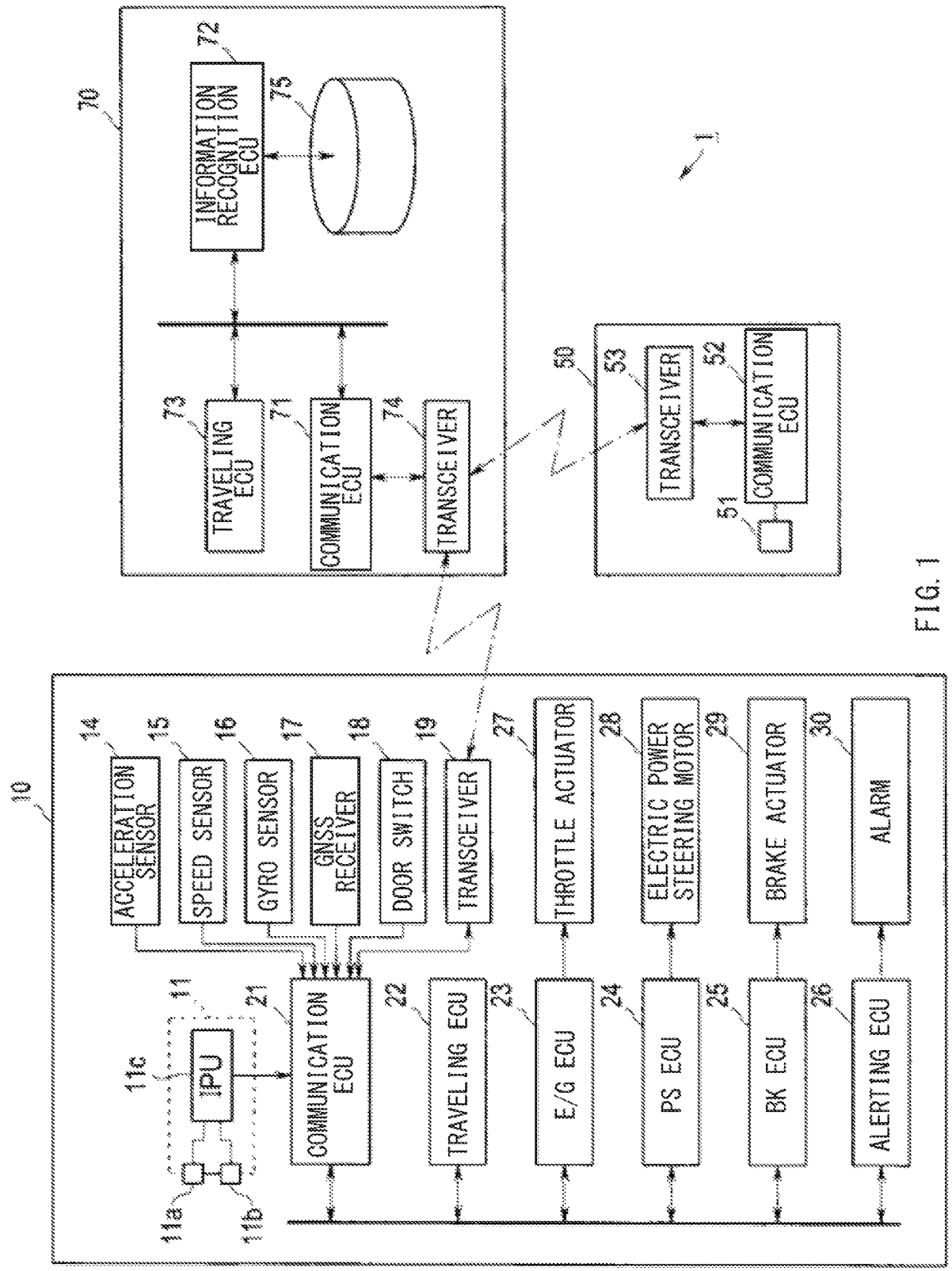
FIG. 1 is an outline configuration diagram illustrating a vehicle driving control system according to one example embodiment of the technology.

The emergency braking control described above is started after an obstacle is actually recognized on the basis of information from an autonomous sensor, for example, mounted on a vehicle. Therefore, in a case where an occupant who has got off a stopped vehicle runs out in front of the own vehicle as a pedestrian when the own vehicle passes by the stopped vehicle, for example, it can be difficult to appropriately perform contact avoidance by the emergency braking control.

It is desirable to provide a vehicle driving control system that makes it possible to perform an appropriate contact avoidance control even for a pedestrian's running-out from a stopped vehicle.

In the following, some example embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, a dimension of each of the elements, a material of each of the elements, a ratio between the elements, relative positional relationship between the elements, and any other specific numerical value are illustrative only for easier understanding and not to be construed as limiting to the technology unless otherwise stated. Further, elements in the following example embodiments which are not recited in a most-generic independent claim of the disclosure are optional and may be provided on an as-needed basis. Throughout the specification and the drawings, elements having substantially the same function and configuration are denoted with the same numerals to avoid redundant description.

Figure 2:
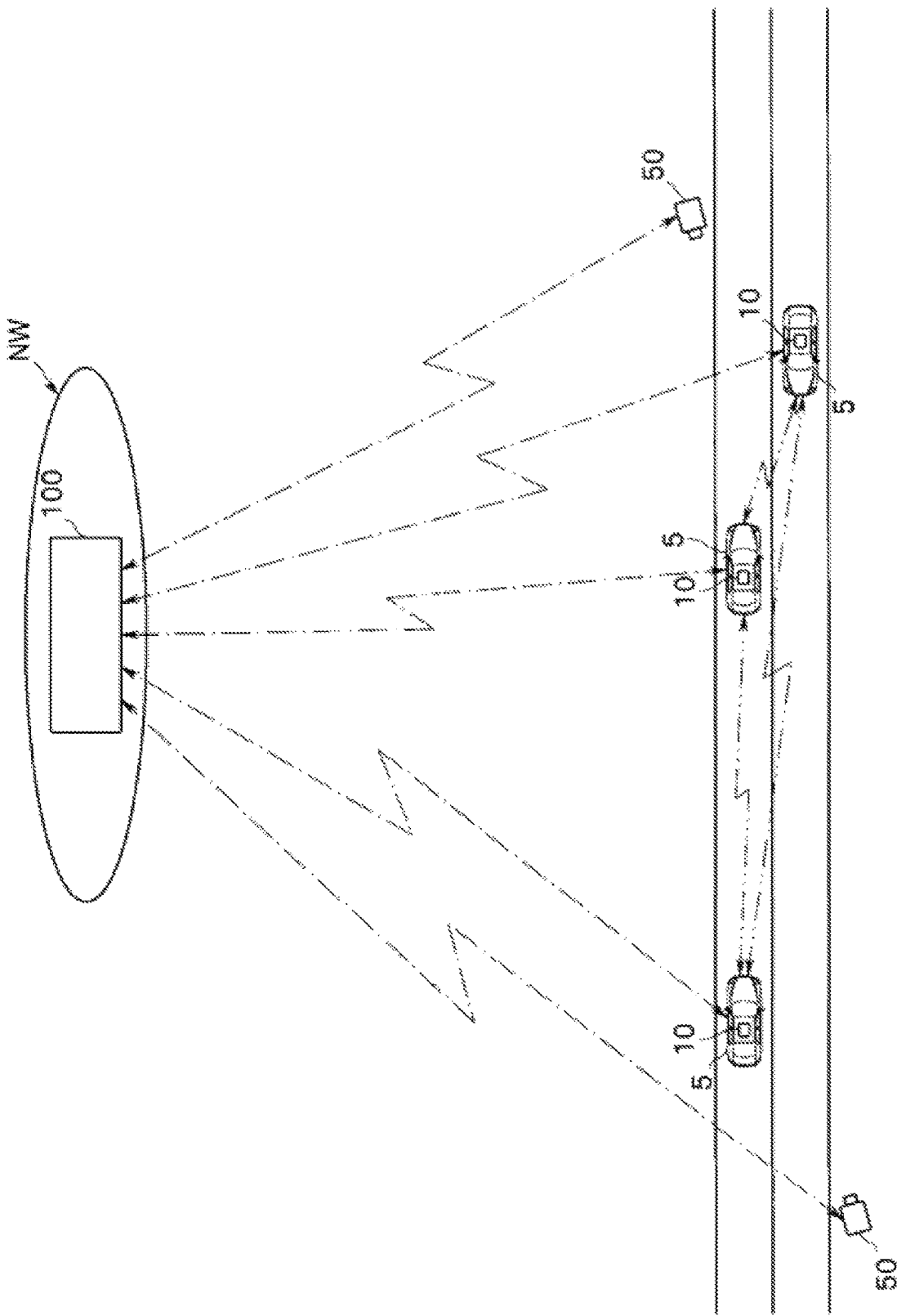
FIG. 2 is an explanatory diagram illustrating vehicle driving control apparatuses and monitoring apparatuses coupled to a traffic control apparatus by high-speed wireless communication, according to one example embodiment of the technology.
Figure 3:
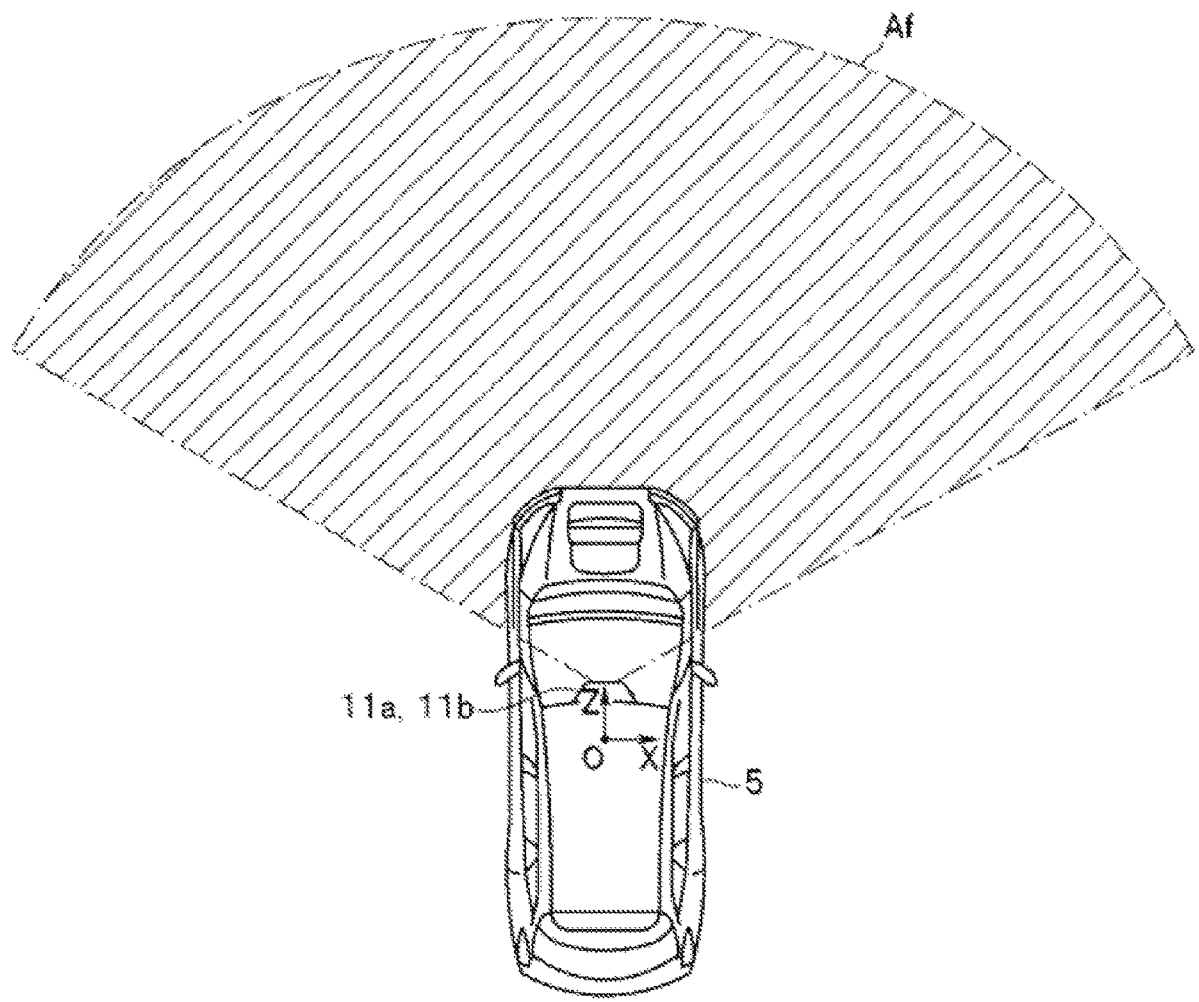
FIG. 3 is an explanatory diagram illustrating a region monitored by a stereo camera according to one example embodiment of the technology.

FIG. 1 to FIG. 15 are related to a first example embodiment of the technology. FIG. 1 is an outline configuration diagram illustrating a vehicle driving control system. FIG. 2 is an explanatory diagram illustrating vehicle driving control apparatuses and monitoring apparatuses coupled to a traffic control apparatus by high-speed wireless communication.

As illustrated in FIG. 1, a driving control system 1 according to the example embodiment may include driving control apparatuses 10 mounted on respective vehicles 5, monitoring apparatuses 50 provided along a road, and a traffic control apparatus 70. The traffic control apparatus 70 may include a short-range server provided in a network environment NW. In one embodiment, the vehicle 5 may serve as a "mobile body".

The driving control apparatus 10 may include a camera unit 11, for example, as an autonomous sensor that detects a traveling environment outside the vehicle. The driving control apparatus 10 may also include a communication control unit (hereinafter referred to as a "communication ECU") 21, a traveling control unit (hereinafter referred to as a "traveling ECU") 22, an engine control unit (hereinafter referred to as an "E/G ECU") 23, a power steering control unit (hereinafter referred to as a "PS ECU") 24, a brake control unit (hereinafter referred to as a "BK ECU") 25, and an alerting control unit (hereinafter referred to as an "alerting ECU"). These control units 21 to 26 may be coupled to each other via an in-vehicle communication line, such as a controller area network (CAN).

The camera unit 11 may be, for example, fixed at an upper-middle position of a front part in a vehicle compartment of the vehicle. The camera unit 11 may include an in-vehicle camera and an image processing unit (IPU) 11c. The in-vehicle camera may be a stereo camera including a main camera 11a and a subsidiary camera 11b.

The main camera 11a and the subsidiary camera 11b may, for example, sense a real space ahead of the vehicle 5. The main camera 11a and the subsidiary camera 11b may be disposed, for example, at respective positions bilaterally symmetrical about the middle in a width direction of the vehicle 5. The main camera 11a and the subsidiary camera 11b may perform stereo imaging of a region Af (see FIG. 3) ahead of the vehicle 5 from different viewpoints.

The IPU 11c may perform predetermined processing on information of images, captured by the stereo imaging by the main camera 11a and the subsidiary camera 11b, of a traveling environment ahead of the vehicle 5. The IPU 11c may thus generate image information that includes distance information determined on the basis of an amount of shift in position of a corresponding target in the images. In other words, the IPU 11c may generate distance image information.

To the communication ECU 21 may be coupled a transceiver 19 compliant with a high-reliability and low-delay communication system (e.g., a fifth-generation mobile communication system), as a transceiver that performs wireless communication with the traffic control apparatus 70 and the driving control apparatus 10 of another vehicle 5.

The communication ECU 21 may have an input terminal coupled to the camera unit 11 and input terminals coupled to various switches and sensors to be used to estimate a position of the vehicle 5 (i.e., an own vehicle position). Examples of the various switches and sensors may include an acceleration sensor 14, a speed sensor 15, a gyro sensor 16, and a GNSS receiver 17. The communication ECU 21 may also have an input terminal coupled to a door switch 18, as an example of switches and sensors that detect vehicle information. In one embodiment, the vehicle information may serve as "mobile body information". The acceleration sensor 14 may detect a longitudinal acceleration rate and a lateral acceleration rate of the vehicle 5. The speed sensor 15 may detect, for example, a speed of rotation of each of a front-right wheel, a front-left wheel, a rear-right wheel, and a rear-left wheel of the vehicle 5. The gyro sensor 16 may detect an angular velocity or angular acceleration of the vehicle 5. The GNSS receiver 17 may receive positioning signals from a plurality of positioning satellites. The door switch 18 may output a door switch signal, e.g., an ON signal, for example, when a door of a vehicle body of the vehicle 5 is opened.

The communication ECU 21 may generate road-traffic detection information, i.e., first road-traffic detection information, including various pieces of information supplied from, for example, the camera unit 11, the acceleration sensor 14, the speed sensor 15, the gyro sensor 16, and the GNSS receiver 17 described above. The communication ECU 21 may also generate vehicle detection information including various pieces of information supplied from the door switch 18, for example. In one embodiment, the vehicle detection information may serve as "mobile-body detection information". The communication ECU 21 may transmit these pieces of detection information to the traffic control apparatus 70 every preset control cycle.

In one example, the communication ECU 21 may generate the road-traffic detection information (i.e., the first road-traffic detection information) including a vehicle ID of the vehicle 5, date and time of transmission, a distance image, the position, e.g., a latitude and a longitude, of the vehicle 5, the acceleration rate of the vehicle 5, the speed of the vehicle 5, and a traveling direction of the vehicle 5, as illustrated in FIG. 4. The communication ECU 21 may also generate, for example, vehicle detection information including an ON/OFF state of the door switch signal, as information associated with the road-traffic detection information. Note that the communication ECU 21 may generate the vehicle detection information independently of the road-traffic detection information. The communication ECU 21 may transmit the generated first road-traffic detection information and vehicle detection information to the traffic control apparatus 70 through the transceiver 19.

In addition, the communication ECU 21 may receive, through the transceiver 19, road map information transmitted as appropriate from the traffic control apparatus 70. The road map information will be described later.

The road map information that is transmitted from the traffic control apparatus 70 may be map information in which road traffic information that changes from moment to moment is reflected in real time on the basis of information collected from, for example, each vehicle 5 and each monitoring apparatus 50 present within a predetermined traffic control area.

The communication ECU 21 may also receive, through the transceiver 19, control information transmitted as appropriate from the traffic control apparatus 70. The control information will be described later.

The control information may include, for example, a target acceleration or deceleration rate to be used to restrict the own vehicle speed to equal to or less than a predetermined set speed when the own vehicle, i.e., a target vehicle 5, passes by a stopped vehicle, i.e., another vehicle 5. The control information may also include a target deceleration rate to be used to perform a deceleration control of the vehicle 5 in an emergency where the vehicle 5 is likely to come into contact with an obstacle. Upon receiving the target acceleration or deceleration rate (or the target deceleration rate), the communication ECU 21 may supply the received target acceleration or deceleration rate to the E/G ECU 23 and the BK ECU 25. This enables the E/G ECU 23 and the BK ECU 25 to execute a speed control of the vehicle 5, i.e., the own vehicle, based on the target acceleration or deceleration rate as an interrupt control.

The control information may also include, for example, a target steering angle to be used to cause the vehicle 5, i.e., the own vehicle, to make a lane change to an adjacent lane in a case where a stopped vehicle, i.e. another vehicle 5, is present ahead on a lane on which the own vehicle is traveling (hereinafter also referred to as a traveling lane of the own vehicle), and a target steering angle to be used to perform a steering control of the vehicle 5 in an emergency. Upon receiving the target steering angle, the communication ECU 21 may supply the received target steering angle to the PS ECU 24. This enables the PS ECU 24 to execute the steering control based on the target steering angle as an interrupt control.

In other words, in the example embodiment, each piece of control information that is transmitted from the traffic control apparatus 70 may have higher priority than control information calculated by the traveling ECU 22 of the vehicle 5. The control information calculated by the traveling ECU 22 will be described later.

As described above, in the example embodiment, the camera unit 11, the acceleration sensor 14, the speed sensor 15, the gyro sensor 16, and the GNSS receiver 17, for example, may serve as a first road-traffic detection information acquisition unit. The door switch 18 may serve as a vehicle detection information acquisition unit, or a mobile-body detection information acquisition unit. These acquisition units may be collectively referred to as a mobile-body-side information acquisition unit. In one embodiment, the first road-traffic detection information acquisition unit and the vehicle detection information acquisition unit may serve as an "information acquisition unit".

The transceiver 19 may serve as a first communicator. In one embodiment, the transceiver 19, or the first communicator, may serve as a "mobile-body-side communicator". Note that the communication ECU 21 may also be configured to transmit, through the transceiver 19, the detection information including the first road-traffic detection information and the vehicle detection information to another vehicle 5 present around the vehicle 5 (see FIG. 2).

The traveling ECU 22 may calculate control information for the vehicle 5, i.e., the own vehicle, on the basis of the road map information received from the traffic control apparatus 70. In the example embodiment, the traveling ECU 22 may mainly calculate control information related to an improvement in a driver's convenience.

For example, the traveling ECU 22 may calculate a target acceleration or deceleration rate, as control information for an adaptive cruise control (ACC), on the basis of the road map information. In other words, in a case where a preceding vehicle is recognized as being present ahead on a lane on which the own vehicle is traveling on the basis of the road map information, the traveling ECU 22 may calculate the target acceleration or deceleration rate to be used to cause the own vehicle to travel to follow the preceding vehicle while keeping a predetermined distance between the own vehicle and the preceding vehicle. In a case where no preceding vehicle is recognized as being present ahead on the lane on which the own vehicle is traveling on the basis of the road map information, the traveling ECU 22 may calculate the target acceleration or deceleration rate to be used to cause the own vehicle to travel at a constant set vehicle speed. The traveling ECU 22 may supply the calculated target acceleration or deceleration rate to the E/G ECU 23 and the BK ECU 25. This enables the E/G ECU 23 and the BK ECU 25 to execute a vehicle speed control based on the target acceleration or deceleration rate.

For example, the traveling ECU 22 may calculate a target steering angle, as control information for a lane keep control, e.g., an active lane keep centering (ALKC) control, on the basis of the road map information. In other words, the traveling ECU 22 may calculate the target steering angle to be used to keep the own vehicle at the middle of the lane on which the own vehicle is traveling, on the basis of the road map information. The traveling ECU 22 may supply the calculated target steering angle to the PS ECU 24. This enables the PS ECU 24 to execute a steering control based on the target steering angle.

The E/G ECU 23 may have an output terminal coupled to a throttle actuator 27. The throttle actuator 27 may open and close a throttle valve of an electronic control throttle device disposed on a throttle body of an engine. The throttle actuator 27 may open or close the throttle valve in response to a driving signal from the E/G ECU 23 to regulate an intake air flow, thereby generating an engine output at a desired level.

The PS ECU 24 may have an output terminal coupled to an electric power steering motor 28. The electric power steering motor 28 may impart a steering torque to a steering mechanism using a rotary power of the motor. The electric power steering motor 28 may generate a desired steering angle in response to a driving signal from the PS ECU 24.

The BK ECU 25 may have an output terminal coupled to a brake actuator 29. The brake actuator 29 may regulate a brake hydraulic pressure to be applied to a brake wheel cylinder of each of the wheels. When the brake actuator 29 is driven in response to a driving signal from the BK ECU 25, the brake wheel cylinder may generate a brake force on each of the wheels, which forcibly decelerates the vehicle 5.

The alerting ECU 26 may have an output terminal coupled to an alarm 30. The alarm 30 may output a predetermined alert to the driver. The alarm 30 may include, for example, a multi-information display and a speaker provided on an instrument panel. The alarm 30 may present a predetermined warning display or output an alert sound to the driver, in response to a driving signal from the alerting ECU 26.

As described above, in one embodiment, the E/G ECU 23, the PS ECU 24, the BK ECU 25 may serve as a "driving control execution unit".

The monitoring apparatuses 50 may be roadside infrastructures for observation of a traveling environment, for example, and may be disposed at fixed points at predetermined intervals along a roadside. Each monitoring apparatus 50 may include, for example, a camera unit 51 and a communication ECU 52.

The camera unit 51 may include a monocular camera, for example. The camera unit 51 may be disposed to have an optical axis inclined at a predetermined depression angle from above the roadside toward a road surface. This enables the camera unit 51 to detect image information including vehicles traveling on a road, for example.

To the communication ECU 52 may be coupled a transceiver 53 compliant with a high-reliability and low-delay communication system (e.g., a fifth-generation mobile communication system), as a transceiver that performs wireless communication with the traffic control apparatus 70. The communication ECU 52 may have an input terminal coupled to the camera unit 51.

The communication ECU 52 may generate road-traffic detection information, i.e., second road-traffic detection information, including image information supplied from the camera unit 51 described above. The communication ECU 52 may transmit the road-traffic detection information to the traffic control apparatus 70 every preset control cycle.

In one example, the communication ECU 52 may generate the road-traffic detection information including an ID of the monitoring apparatus 50, date and time of transmission, an image, and a position, e.g., a latitude and a longitude, of the monitoring apparatus 50, as illustrated in FIG. 5. The communication ECU 52 may transmit the generated road-traffic detection information to the traffic control apparatus 70 through the transceiver 53.

As described above, in the example embodiment, the camera unit 51 may serve as a second road-traffic detection information acquisition unit, and the transceiver 53 may serve as a roadside communicator, i.e., a third communicator.

The traffic control apparatus 70 may be an edge server, i.e., a MEC server, of a network environment based on edge computing, for example, and may be disposed for each predetermined traffic control area. The traffic control apparatus 70 may include, for example, a communication control unit (hereinafter referred to as a "communication ECU") 71, an information recognition control unit (hereinafter referred to as an "information recognition ECU") 72, and a traveling control unit (hereinafter referred to as a "traveling ECU") 73. These control units 71 to 73 may be coupled to each other via a predetermined communication line. The control units 71 to 73 may have higher-performance specifications than the control units mounted on the vehicle 5. Note that the control units 71 to 73 may be configured by a single control unit.

To the communication ECU 71 may be coupled a transceiver 74 compliant with a high-reliability and low-delay communication system (e.g., a fifth-generation mobile communication system), as a transceiver that performs wireless communication with the driving control apparatus 10 of each vehicle 5 and each monitoring apparatus 50.

When the transceiver 74 receives road-traffic detection information from the driving control apparatus 10 of each vehicle 5 and each monitoring apparatus 50, the communication ECU 71 may supply the received road-traffic detection information to the information recognition ECU 72.

In addition, when control information for a vehicle 5 is supplied from the traveling ECU 73, the communication ECU 71 may transmit the supplied control information to the corresponding vehicle 5 through the transceiver 74. The control information will be described later.

When road map information is supplied from the information recognition ECU 72, the communication ECU 71 may transmit the supplied road map information to each vehicle 5 through the transceiver 74.

As described above, the transceiver 74 may serve as a second communicator. In one embodiment, the transceiver 74 may serve as a "traffic-control-side communicator".

To the information recognition ECU 72 may be coupled a high-precision road map database 75. The high-precision road map database 75 may be a large-capacity storage medium such as a hard disk drive (HDD). The high-precision road map database 75 may hold high-precision road map information, e.g., a dynamic map, as information to be used in performing a traveling control of each vehicle 5 traveling on a road. The high-precision road map information may include three layers of information of static information, quasi-dynamic information, and dynamic information. The static information may mainly configure road information. The quasi-dynamic information and the dynamic information may mainly configure traffic information.

The static information may include, for example, information to be updated within every month, such as information on roads, structures on roads, lanes, road surfaces, and permanent regulation.

The quasi-dynamic information may include, for example, information to be updated within every minute, such as information on actual traffic congestion and regulation at the time of observation, temporary traffic obstruction due to fallen objects and obstacles, actual accidents, and weather in a narrow area.

The dynamic information may include, for example, information to be updated within every second, such as information transmitted and exchanged between mobile bodies, and information on the current indication of traffic lights, pedestrians and two-wheeled vehicles at an intersection, and vehicles going straight through an intersection. In the example embodiment, the dynamic information may also include various pieces of vehicle information related to a state of the vehicle 5, such as open/closed information of a door.

Such road map information may be maintained and updated on cycles from the reception of the information to the reception of subsequent information from the driving control apparatus 10 of each vehicle 5 and each monitoring apparatus 50. The updated information may be supplied to the communication ECU 71 and the traveling ECU 73 as appropriate. As road map information to be supplied to the communication ECU 71, it is possible to supply all of the road map information within the traffic control area. However, in consideration of communication load with the communication ECU 21 of the vehicle 5, only road map information to be used to calculate control information by the traveling ECU 22 of each vehicle 5 may be extracted. The extracted road map information may be supplied as individual road map information associated with the ID of each vehicle 5.

In updating the road map information, the information recognition ECU 72 may analyze the road-traffic detection information received from the driving control apparatus 10 of each vehicle 5 and the road-traffic detection information received from each monitoring apparatus 50, and perform a process of recognizing road traffic information.

For example, upon receiving the road-traffic detection information from the driving control apparatus 10, the information recognition ECU 72 may recognize the current position of the vehicle 5 on a road map, and may also recognize a movement direction and a movement speed, for example, of the vehicle 5.

In addition, the information recognition ECU 72 may determine lane lines that divide a road around the vehicle 5 on the basis of the received distance image information, for example. The information recognition ECU 72 may also determine a road curvature [1/m] of lane lines that define right and left of a traveling course along which the vehicle 5 travels, and a width (i.e., a lane width) between the lane lines.

The information recognition ECU 72 may further perform predetermined pattern matching on the distance image information to recognize a three-dimensional object. Examples of the three-dimensional object may include a guard rail and a curbstone that extend along the road, and a pedestrian, a two-wheeled vehicle, and a vehicle other than a two-wheeled vehicle that are present on the road. In recognizing the three-dimensional object, the information recognition ECU 72 may recognize, for example, a type of the three-dimensional object, a distance from the vehicle 5 to the three-dimensional object, and a speed of the three-dimensional object.

Similarly, upon receiving the road-traffic detection information from the monitoring apparatus 50, the information recognition ECU 72 may perform the process of recognizing the road traffic information by, for example, performing a known image recognition process on the basis of the received image information.

In addition, the information recognition ECU 72 may analyze the vehicle detection information received from the driving control apparatus 10, and perform a process of recognizing vehicle information.

For example, in a case where the received vehicle detection information includes a door switch signal, e.g., an ON signal, the information recognition ECU 72 may recognize an open state of the door of the vehicle 5, as the vehicle information.

Upon recognizing the road traffic information and the vehicle information on the basis of the road-traffic detection information and the vehicle detection information from the driving control apparatus 10 and the monitoring apparatus 50 in this manner, the information recognition ECU 72 may update the road map information held in the high-precision road map database 75 at any time, on the basis of the recognized road traffic information and vehicle information. This information update may be performed for not only the static information, but also the quasi-dynamic information and the dynamic information. This allows the road map information to include the latest road traffic information acquired by communication with the outside of the traffic control apparatus 70, and allows information on mobile bodies, such as vehicles, traveling on a road to be updated in real time.

As described above, in one embodiment, the information recognition ECU 72 may serve as a "road map information updating unit".

The traveling ECU 73 calculates control information for each vehicle 5 present within the traffic control area of the traffic control apparatus 70. As the control information, the traveling ECU 73 may calculate, in a case where a stopped vehicle is present on a road within the traffic control area, for example, control information for another vehicle 5 traveling in a direction approaching the stopped vehicle to travel safely while avoiding the stopped vehicle. As the control information, the traveling ECU 73 may also calculate control information for each vehicle 5 to avoid contact with an obstacle in an emergency. Various programs to be used to calculate the control information by the traveling ECU 73 may be updatable to latest programs at any time, for example, through the network environment NW.

In one example, when a stopped vehicle is detected on the basis of the road map information reflecting the road traffic information and the vehicle information, the traveling ECU 73 may extract, as target vehicles, one or more vehicles 5 traveling in the direction approaching the stopped vehicle on the same road. The traveling ECU 73 may calculate control information for each target vehicle to pass at a vehicle speed equal to or less than a set vehicle speed while avoiding the stopped vehicle.

For example, in a case where the traveling lane of the target vehicle is the same lane as that of the stopped vehicle and where an adjacent lane on which the target vehicle is able to travel is provided together with the traveling lane of the target vehicle, the traveling ECU 73 may calculate a target steering angle to be used to cause the target vehicle to make a lane change to the adjacent lane before the stopped vehicle.

For example, on the basis of the road map information, the traveling ECU 73 may set, as a control start position, a position of the target vehicle at a time when a distance D from the target vehicle to the stopped vehicle becomes equal to or less than a set distance Dth1, and may also set the middle of the adjacent lane as a target lateral position. The traveling ECU 73 may also calculate, on the basis of lateral jerk allowed in accordance with the vehicle speed of the target vehicle, a first target path from the control start position to an intermediate position between the control start position and the target lateral position, and a second target path from the intermediate position to the target lateral position. The traveling ECU 73 may set a target steering angle to be used to cause the target vehicle to travel along the target path as the control information. Note that the set distance Dth1 in this case may be variably set to increase with an increase in a vehicle speed V of the target vehicle, on the basis of a preset map, for example. In a case where the target vehicle is traveling on a lane different from that of the stopped vehicle on the same road as the stopped vehicle, and the target vehicle is able to pass by the stopped vehicle (e.g., the side of the stopped vehicle), the traveling ECU 73 calculates control information to be used to restrict the vehicle speed V of the target vehicle to equal to or less than the set vehicle speed.

For example, in a case where the distance D from the target vehicle to the stopped vehicle becomes equal to or less than a set distance Dth2 (Dth2<Dth1), on the basis of the road map information, the traveling ECU 73 sets, as the control information, a target acceleration or deceleration rate to be used to restrict the vehicle speed V of the target vehicle to equal to or less than a first set vehicle speed V1 (e.g., 30 km/h). This target acceleration or deceleration rate may be, for example, used to set the vehicle speed V of the target vehicle to the first set vehicle speed V1 after the distance D to the stopped vehicle becomes equal to or less than the set distance Dth2, before the target vehicle reaches a set distance D0 before the stopped vehicle. After setting the vehicle speed V of the target vehicle to the first set vehicle speed V1, the traveling ECU 73 may set, as the control information, a target acceleration or deceleration rate to be used to keep the first set vehicle speed V1, until the target vehicle passes by the stopped vehicle.

Furthermore, in a case where a door of the stopped vehicle has been opened and where the distance D from the target vehicle to the stopped vehicle becomes equal to or less than the set distance Dth2, the traveling ECU 73 sets, as the control information, a target acceleration or deceleration rate to be used to restrict the vehicle speed V of the target vehicle to equal to or less than a second set vehicle speed V2 (e.g., 10 km/h) lower than the first set vehicle speed V1. This target acceleration or deceleration rate may be, for example, used to set the vehicle speed V of the target vehicle to the second set vehicle speed V2 after the distance D to the stopped vehicle becomes equal to or less than the set distance Dth2, before the target vehicle reaches a set distance D0 before the stopped vehicle. After setting the vehicle speed V of the target vehicle to the second set vehicle speed V2, the traveling ECU 73 may set, as the control information, a target acceleration or deceleration rate to be used to keep the second set vehicle speed V2, for the shorter period of a period until a set time period elapses from the opening of the door and a period until the target vehicle passes by the stopped vehicle.

The control information to be used to restrict the vehicle speed V to equal to or less than the second set vehicle speed V2 may have higher priority than the control information to be used to restrict the vehicle speed V to equal to or less than the first set vehicle speed V1.

When an obstacle that is likely to come into contact with the vehicle 5 is detected ahead along the traveling course of the vehicle 5 on the basis of the road map information, the traveling ECU 73 may calculate control information for an emergency braking control, e.g., an autonomous emergency braking (AEB) control, of causing the vehicle 5 to stop before the obstacle.

In the example embodiment, an obstacle may refer to a three-dimensional object that is likely to come into contact with the vehicle 5. In one example, the obstacle may refer to a three-dimensional object at least partly overlapping with the vehicle 5 ahead along the traveling course of the vehicle 5. Examples of the obstacle may include, as well as another vehicle 5 stopped near a road shoulder, a preceding vehicle 5 that has suddenly decelerated or stopped ahead of the vehicle 5, and a pedestrian crossing the traveling course. In the example embodiment, needless to say, examples of the pedestrian may also include an occupant who has got off a stopped vehicle.

The control information for the emergency braking control may be set on the basis of the obstacle recognized by the information recognition ECU 72. For example, control information for a primary braking control and control information for a secondary braking control may be set in sequential phases.

The primary braking control may be an alert braking control of prompting the driver to perform an operation of avoiding contact with the obstacle. The primary braking control may be a gentle braking control of decelerating the vehicle 5 by using a relatively low deceleration rate a0.

The secondary braking control may be a main braking control performed in a case where the driver does not perform an appropriate contact avoidance operation in response to the primary braking control. The secondary braking control may be a strong braking control of decelerating the vehicle 5 until a relative speed with respect to the obstacle becomes "0" by using a deceleration rate ap higher than in the primary braking control.

The pieces of control information for these braking controls may be set in a case where the relationship between a relative speed Vrel and a relative distance D between the vehicle 5 and the obstacle becomes equal to or less than a threshold.

In the example embodiment, for example, the traveling ECU 73 may calculate braking control start distances Dth3 and Dth4 serving as distance thresholds, on the basis of the relationship between the relative speed Vrel and an overlap ratio R between the vehicle 5 and the obstacle. To calculate these distance thresholds Dth3 and Dth4, the traveling ECU 73 may have a map for setting of a primary braking control start distance and a map for setting of a secondary braking control start distance stored therein. The maps may be preset on the basis of an experiment or a simulation, for example. These maps may be set as follows, for example: as the relative speed Vrel becomes lower, the distance threshold is set to a smaller value to delay a deceleration start timing; and, as the overlap ratio R becomes lower, the distance threshold is set to a smaller value to delay the deceleration start timing. In other words, the maps may be set to leave, as the relative speed Vrel becomes lower and the overlap ratio R becomes lower, more room for the driver to avoid contact with the obstacle by his/her own driving operation.

In a case where the relative distance D becomes equal to or less than the primary braking control start distance Dth3, the traveling ECU 73 may set the target deceleration rate a0 as the control information for the vehicle 5.

In a case where an appropriate avoidance operation, for example, is not performed by the driver during the primary braking control, and the relative distance D becomes equal to or less than the secondary braking control start distance Dth4, the traveling ECU 73 may set the target deceleration rate ap as the control information for the vehicle 5.

Note that time-to-contact (TTC) to be described later may be a parameter having substantially the same meaning as the relative distance D in the braking control. Therefore, it is also possible to use the TTC as a parameter indicating the relationship between the relative speed Vrel and the relative distance D.

During the execution of the secondary braking control, the traveling ECU 73 may calculate the TTC that is time to be taken until the vehicle 5 comes into contact with the obstacle. The TTC may be, for example, a value expressed by (relative distance D)/(relative speed Vrel) and calculated by dividing the relative distance D between the vehicle 5 and the front obstacle, by the relative speed Vrel between the vehicle 5 and the front obstacle.

In a case where the TTC is equal to or less than a preset threshold Tth, the traveling ECU 73 may determine that it is difficult to avoid contact with the obstacle by the braking control, and may calculate control information for an emergency steering control, e.g., an autonomous emergency steering (AES) control, to perform emergency contact avoidance for the obstacle by steering. The threshold Tth may be a threshold to be used to determine, in the relationship with the TTC, whether there is time left to avoid contact between the vehicle 5 and the obstacle by the emergency braking control.

For this steering control, the traveling ECU 73 may calculate a target lateral position for the vehicle 5 to avoid contact with the obstacle. The traveling ECU 73 may also calculate, as a target path for the emergency steering control, a first target path from a control start position to an intermediate position between the control start position and the target lateral position, and a second target path from the intermediate position to the target lateral position. For example, the vehicle position at a time when the TTC becomes equal to or less than the set threshold Tth may be regarded as the control start position, and lateral jerk allowed in accordance with the vehicle speed may be used for the calculation. The traveling ECU 73 may set a target steering angle to be used to cause the vehicle 5 to travel along the target path as the control information.

Furthermore, in a case where a behavior of the vehicle 5 for which the control information has been set has an influence on another vehicle 5, the traveling ECU 73 may calculate control information for contact avoidance (i.e., control information for the emergency braking control or the emergency steering control) also for the other vehicle 5, on an as-needed basis.

Each piece of control information thus calculated may be supplied from the traveling ECU 73 to the communication ECU 71. The communication ECU 71 may transmit each piece of control information to the corresponding vehicle 5 through the transceiver 74. As described above, in one embodiment, the traveling ECU 73 may serve as a "control information calculation unit".

Figure 6:
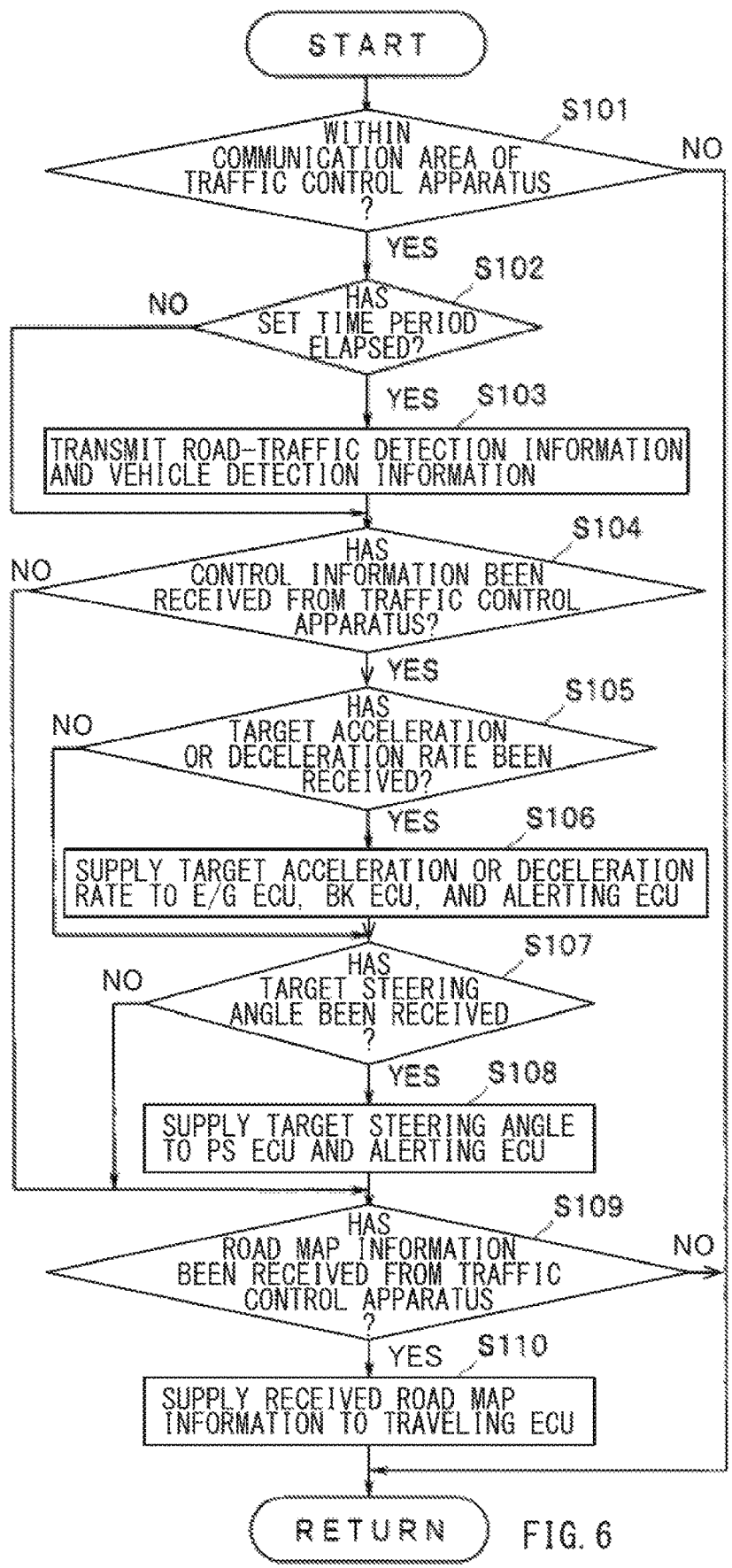
FIG. 6 is a flowchart illustrating a communication control routine that is executed by a communication control unit of the driving control apparatus according to one example embodiment of the technology.

A description is given next of a communication control that is executed by the communication ECU 21 of the driving control apparatus 10, with reference to a flowchart of a communication control routine illustrated in FIG. 6. This routine may be executed repeatedly every set cycle by the communication ECU 21.

Upon start of the routine, the communication ECU 21 may check whether the vehicle 5 is present within a communication area, i.e., the traffic control area, of the traffic control apparatus 70 in step S101.

If the communication ECU 21 determines in step S101 that the vehicle 5 is present out of the communication area (step S101: NO), the communication ECU 21 may exit the routine.

If the communication ECU 21 determines in step S101 that the vehicle 5 is present within the communication area (step S101: YES), the communication ECU 21 may cause the flow to proceed to step S102, and check whether a set time period (e.g., 200 msec) has elapsed from the previous transmission of first road-traffic detection information and vehicle detection information.

If the communication ECU 21 determines in step S102 that the set time period has elapsed (step S102: YES), the communication ECU 21 may cause the flow to proceed to step S103, transmit first road-traffic detection information and vehicle detection information through the transceiver 19, and thereafter cause the flow to proceed to step S104.

If the communication ECU 21 determines in step S102 that the set time period has not elapsed (step S102: NO), the communication ECU 21 may cause the flow to proceed to step S104.

When the flow proceeds from step S102 or step S103 to step S104, the communication ECU 21 may check whether control information has been received, through the transceiver 19, from the traffic control apparatus 70 corresponding to the traffic control area where the vehicle 5 is currently present.

If the communication ECU 21 determines in step S104 that control information has not been received (step S104: NO), the communication ECU 21 may cause the flow to proceed to step S109.

If the communication ECU 21 determines in step S104 that control information has been received (step S104: YES), the communication ECU 21 may cause the flow to proceed to step S105, and check whether the received control information includes a target acceleration or deceleration rate.

If the communication ECU 21 determines in step S105 that the received control information includes a target acceleration or deceleration rate (step S105: YES), the communication ECU 21 may cause the flow to proceed to step S106, supply the target acceleration or deceleration rate to the E/G ECU 23, the BK ECU 25, and the alerting ECU 26, and thereafter cause the flow to proceed to step S107. Thus, the E/G ECU 23 and the BK ECU 25 may perform, on the basis of the supplied target acceleration or deceleration rate, the vehicle speed control in passing by a stopped vehicle or the emergency braking control for an obstacle, for example. The alerting ECU 26 may perform a predetermined alerting control corresponding to the target acceleration or deceleration rate as appropriate.

If the communication ECU 21 determines in step S105 that the received control information does not include a target acceleration or deceleration rate (step S105: NO), the communication ECU 21 may cause the flow to proceed to step S107.

When the flow proceeds from step S105 or step S106 to step S107, the communication ECU 21 may check whether the received control information includes a target steering angle.

If the communication ECU 21 determines in step S107 that the received control information includes a target steering angle (step S107: YES), the communication ECU 21 may cause the flow to proceed to step S108, supply the target steering angle to the PS ECU 24 and the alerting ECU 26, and thereafter cause the flow to proceed to step S109. Thus, the PS ECU 24 may perform, on the basis of the supplied target steering angle, the lane change control for avoidance of a stopped vehicle or the emergency steering control for an obstacle, for example. The alerting ECU 26 may perform a predetermined alerting control corresponding to the target steering angle as appropriate.

If the communication ECU 21 determines in step S107 that the received control information does not include a target steering angle (step S107: NO), the communication ECU 21 may cause the flow to proceed to step S109.

When the flow proceeds from step S107 or step S108 to step S109, the communication ECU 21 may check whether road map information has been received, through the transceiver 19, from the traffic control apparatus 70 corresponding to the traffic control area where the vehicle 5 is currently present.

If the communication ECU 21 determines in step S109 that road map information has not been received (step S109: NO), the communication ECU 21 may exit the routine.

If the communication ECU 21 determines in step S109 that road map information has been received (step S109: YES), the communication ECU 21 may cause the flow to proceed to step S110, supply the received road map information to the traveling ECU 22, and thereafter exit the routine.

Although a detailed description is omitted, also the communication ECU 52 of the monitoring apparatus 50 may perform processes similar to step S102 and step S103 described above, and transmit second road-traffic detection information to the traffic control apparatus 70.

Figure 7:
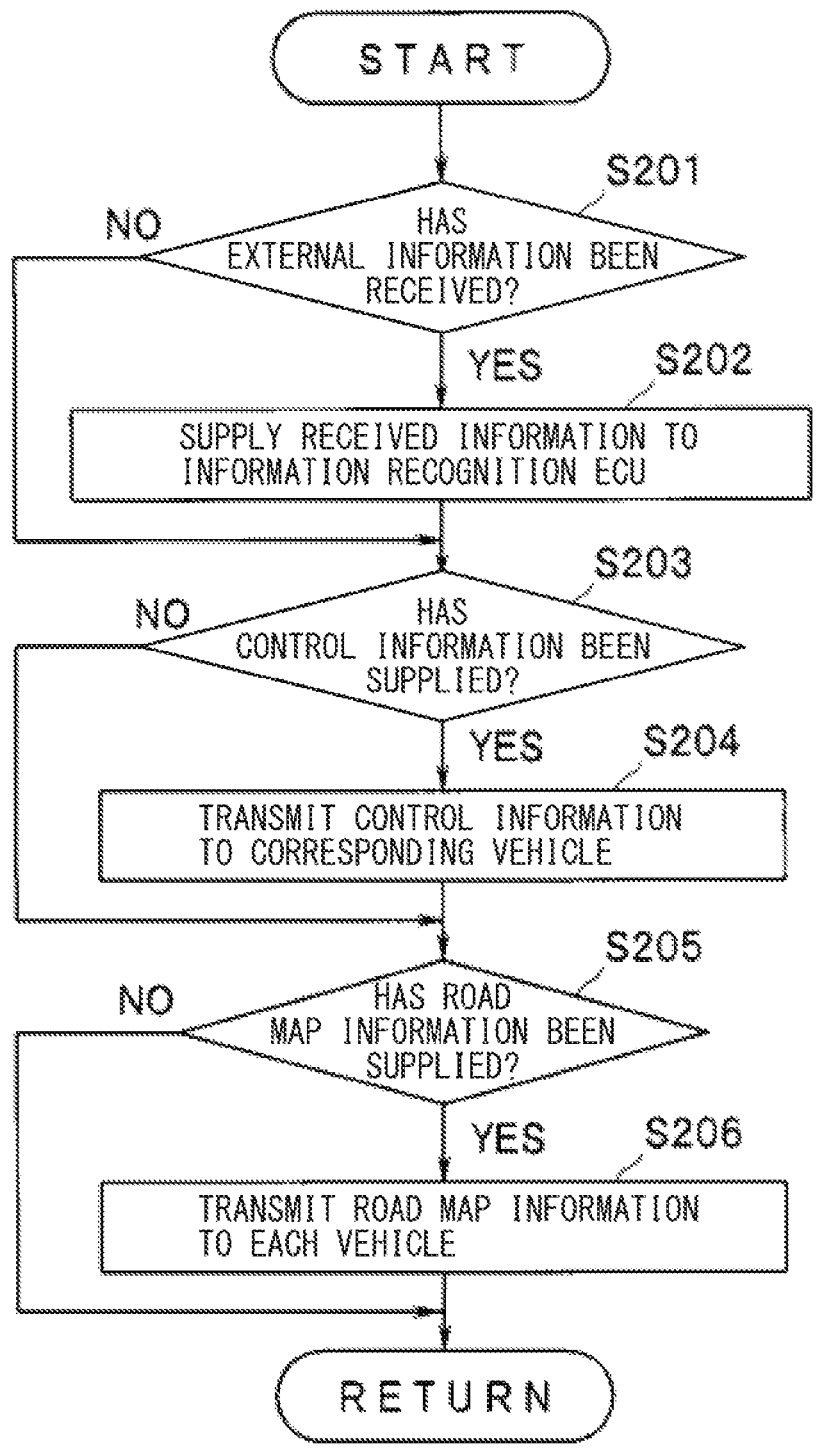
FIG. 7 is a flowchart illustrating a communication control routine that is executed by a communication control unit of the traffic control apparatus according to one example embodiment of the technology.

A description is given next of a communication control that is executed by the communication ECU 71 of the traffic control apparatus 70, with reference to a flowchart of a communication control routine in FIG. 7. This routine may be executed repeatedly every set cycle by the communication ECU 71.

Upon start of the routine, the communication ECU 71 may check whether external information has been received in step S201. In other words, the communication ECU 71 may check whether first road-traffic detection information and vehicle detection information from the driving control apparatus 10 of the vehicle 5 present within the traffic control area, second road-traffic detection information from the monitoring apparatus 50, or both have been received.

If the communication ECU 71 determines in step S201 that external information has been received (step S201: YES), the communication ECU 71 may cause the flow to proceed to step S202, supply the received information to the information recognition ECU 72, and thereafter cause the flow to proceed to step S203.

If the communication ECU 71 determines in step S201 that external information has not been received (step S201: NO), the communication ECU 71 may cause the flow to proceed to step S203.

When the flow proceeds from step S201 or step S202 to step S203, the communication ECU 71 may check whether control information has been supplied from the traveling ECU 73.

If the communication ECU 71 determines in step S203 that control information has been supplied (step S203: YES), the communication ECU 71 may cause the flow to proceed to step S204, transmit the control information, through the transceiver 74, to the vehicle 5 with the ID corresponding to the supplied control information, and thereafter cause the flow to proceed to step S205.

If the communication ECU 71 determines in step S203 that control information has not been supplied (step S203: NO), the communication ECU 71 may cause the flow to proceed to step S205.

When the flow proceeds from step S203 or step S204 to step S205, the communication ECU 71 may check whether newly updated road map information has been supplied from the information recognition ECU 72.

If the communication ECU 71 determines in step S205 that road map information has been supplied (step S205: YES), the communication ECU 71 may cause the flow to proceed to step S206, transmit the supplied road map information to each vehicle 5 within the traffic control area, and thereafter exit the routine.

If the communication ECU 71 determines in step S205 that road map information has not been supplied (step S205: NO), the communication ECU 71 may exit the routine.

Figure 8:
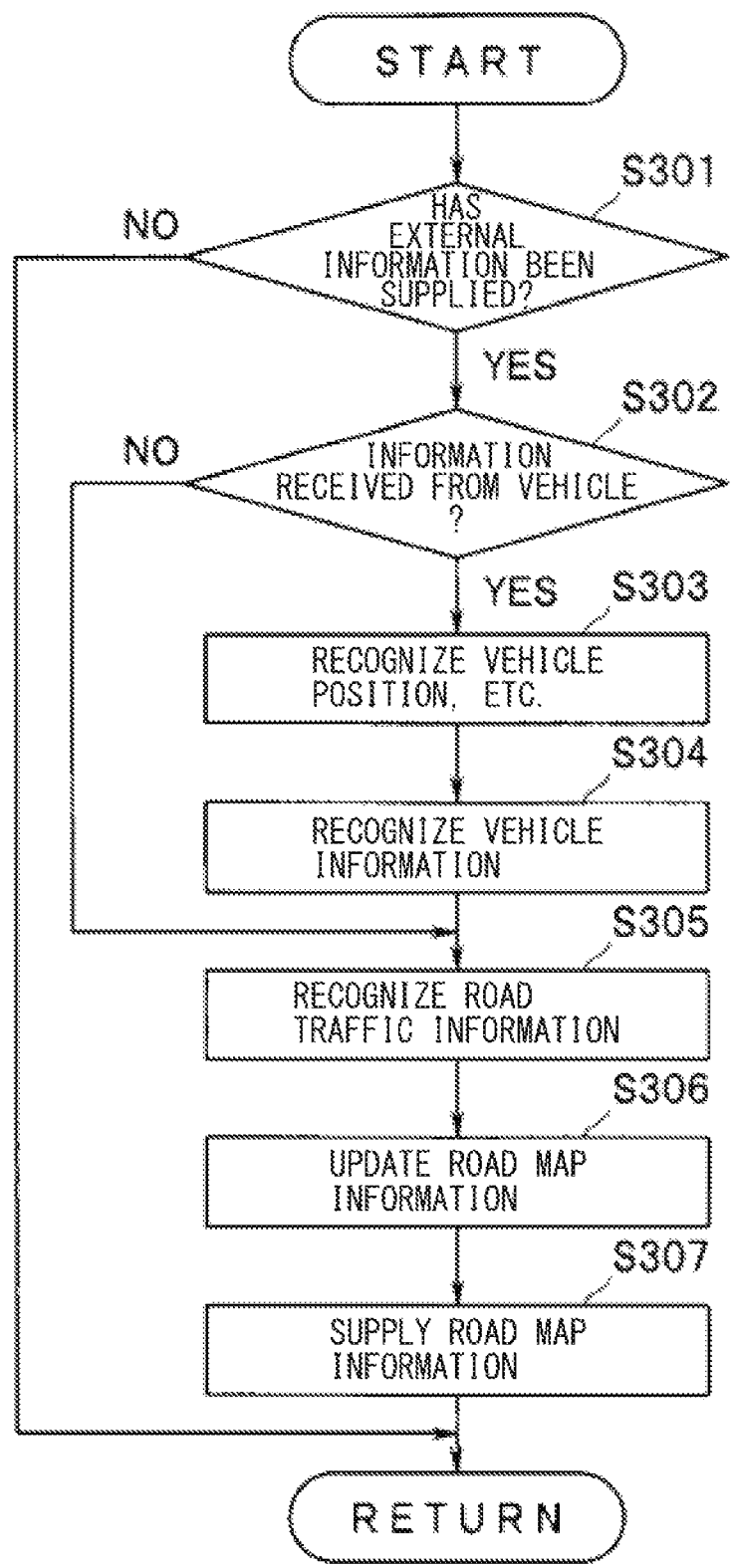
FIG. 8 is a flowchart illustrating an information recognition routine that is executed by an information recognition control unit of the traffic control apparatus according to one example embodiment of the technology.

A description is given next of an information recognition process that is executed by the information recognition ECU 72, with reference to a flowchart of an information recognition routine illustrated in FIG. 8. This routine may be executed repeatedly every set cycle by the information recognition ECU 72.

Upon start of the routine, the information recognition ECU 72 may check whether external information has been supplied through the communication ECU 71.

If the information recognition ECU 72 determines in step S301 that external information has not been supplied (step S301: NO), the information recognition ECU 72 may exit the routine.

If the information recognition ECU 72 determines in step S301 that external information has been supplied (step S301: YES), the information recognition ECU 72 may cause the flow to proceed to step S302, and check whether the supplied information is information from a vehicle 5, i.e., whether the supplied information is first road-traffic detection information and vehicle detection information.

If the information recognition ECU 72 determines in step S302 that the supplied information is not information from a vehicle 5 (step S302: NO), i.e., that the supplied information is second road-traffic detection information, the information recognition ECU 72 may cause the flow to proceed to step S305.

If the information recognition ECU 72 determines in step S302 that the supplied information is information from a vehicle 5 (step S302: YES), the information recognition ECU 72 may cause the flow to proceed to step S303. In step S303, the information recognition ECU 72 may recognize, on the basis of the first road-traffic detection information, the current position of the vehicle 5 on the road map, the traveling direction of the vehicle 5, and the speed of the vehicle 5, for example, and thereafter cause the flow to proceed to step S304.

When the flow proceeds from step S303 to step S304, the information recognition ECU 72 may recognize vehicle information on the basis of the vehicle detection information, and thereafter cause the flow to proceed to step S305. For example, in a case where the vehicle detection information includes a door switch signal, the information recognition ECU 72 may recognize that a door of the vehicle 5 is in the open state, as the vehicle information of the vehicle 5.

When the flow proceeds from step S302 or step S304 to step S305, the information recognition ECU 72 may recognize road traffic information on the basis of the supplied road-traffic detection information.

For example, in a case of recognizing the road traffic information on the basis of the first road-traffic detection information, the information recognition ECU 72 may recognize, with respect to the vehicle position and the traveling direction, for example, recognized in step S303, various pieces of information, including lane lines on a road, a lane width, and a three-dimensional object such as another vehicle or a pedestrian. The information recognition ECU 72 may further recognize, for example, a movement speed of various three-dimensional objects on the basis of a relative speed with respect to the vehicle 5.

For example, in a case of recognizing the road traffic information on the basis of the second road-traffic detection information, the information recognition ECU 72 may recognize, with respect to coordinates of the monitoring apparatus 50 and an optical axis direction of the camera unit 51, various pieces of information, including lane lines on a road, a lane width, and a three-dimensional object such as another vehicle or a pedestrian. The information recognition ECU 72 may further recognize, for example, a movement speed of various three-dimensional objects.

When the flow proceeds from step S305 to step S306, the information recognition ECU 72 may update road map information with the vehicle information and the road traffic information recognized in step S304 and step S305, for example, and thereafter cause the flow to proceed to step S307.

When the flow proceeds from step S306 to step S307, the information recognition ECU 72 may supply the road map information updated in step S306 to the communication ECU 71 and the traveling ECU 73, and thereafter exit the routine.

Figure 9:
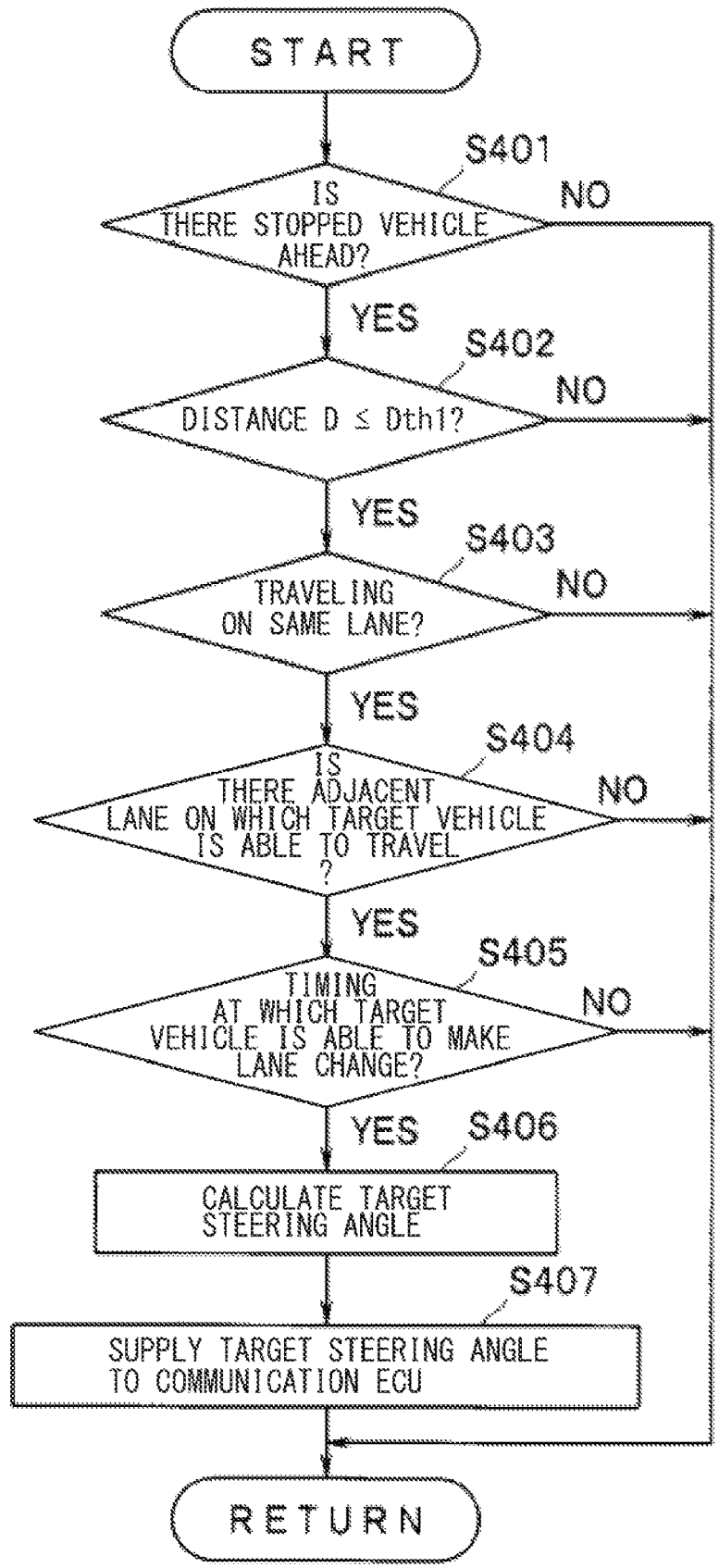
FIG. 9 is a flowchart illustrating a target steering angle calculation routine that is executed by a traveling control unit of the traffic control apparatus according to one example embodiment of the technology.

A description is given next of target steering angle calculation that is executed by the traveling ECU 73, with reference to a flowchart of a target steering angle calculation routine illustrated in FIG. 9. This routine may be executed repeatedly every set cycle by the traveling ECU 73, by sequentially extracting each vehicle 5 present within the traffic control area as a target vehicle.

Upon start of the routine, the traveling ECU 73 may check, in step S401, whether a stopped vehicle is present ahead on a road on which the target vehicle is traveling, on the basis of the road map information. Note that the road on which the target vehicle is traveling may be a concept including not only the traveling lane of the target vehicle, but also another lane in the same traveling direction as the traveling lane of the target vehicle, an oncoming lane, and a road shoulder, for example.

If the traveling ECU 73 determines in step S401 that a stopped vehicle is not present ahead on the road on which the target vehicle is traveling (step S401: NO), the traveling ECU 73 may exit the routine.

If the traveling ECU 73 determines in step S401 that a stopped vehicle is present ahead on the road on which the target vehicle is traveling (step S401: YES), the traveling ECU 73 may cause the flow to proceed to step S402, and check whether the distance D from the target vehicle to the stopped vehicle is equal to or less than the set distance Dth1.

If the traveling ECU 73 determines in step S402 that the distance D from the target vehicle to the stopped vehicle is greater than the set distance Dth1 (step S402: NO), the traveling ECU 73 may exit the routine.

If the traveling ECU 73 determines in step S402 that the distance D from the target vehicle to the stopped vehicle is equal to or less than the set distance Dth1 (step S402: YES), the traveling ECU 73 may cause the flow to proceed to step S403, and check whether the target vehicle is traveling on the same lane as the stopped vehicle.

If the traveling ECU 73 determines in step S403 that the target vehicle is traveling on a lane different from that of the stopped vehicle (step S403: NO), the traveling ECU 73 may exit the routine.

If the traveling ECU 73 determines in step S403 that the target vehicle is traveling on the same lane as the stopped vehicle (step S403: YES), the traveling ECU 73 may cause the flow to proceed to step S404, and check whether an adjacent lane on which the target vehicle is able to travel is present.

If the traveling ECU 73 determines in step S404 that an adjacent lane on which the target vehicle is able to travel is not present (step S404: NO), the traveling ECU 73 may exit the routine.

If the traveling ECU 73 determines in step S404 that an adjacent lane on which the target vehicle is able to travel is present (step S404: YES), the traveling ECU 73 may cause the flow to proceed to step S405, and check whether this timing is a timing at which the target vehicle is able to make a lane change. In other words, the traveling ECU 73 may check, on the basis of the road map information, whether a side-by-side vehicle or a subsequent vehicle that hinders the lane change of the target vehicle is absent on the adjacent lane.

If the traveling ECU 73 determines in step S405 that this timing is not the timing at which the target vehicle is able to make a lane change (step S405: NO), the traveling ECU 73 may exit the routine.

If the traveling ECU 73 determines in step S405 that this timing is the timing at which the target vehicle is able to make a lane change (step S405: YES), the traveling ECU 73 may cause the flow to proceed to step S406, and calculate a target steering angle to be used to make a lane change to the adjacent lane.

When the flow proceeds from step S406 to step S407, the traveling ECU 73 may supply the calculated target steering angle to the communication ECU 71, and thereafter exit the routine.

Figure 10:
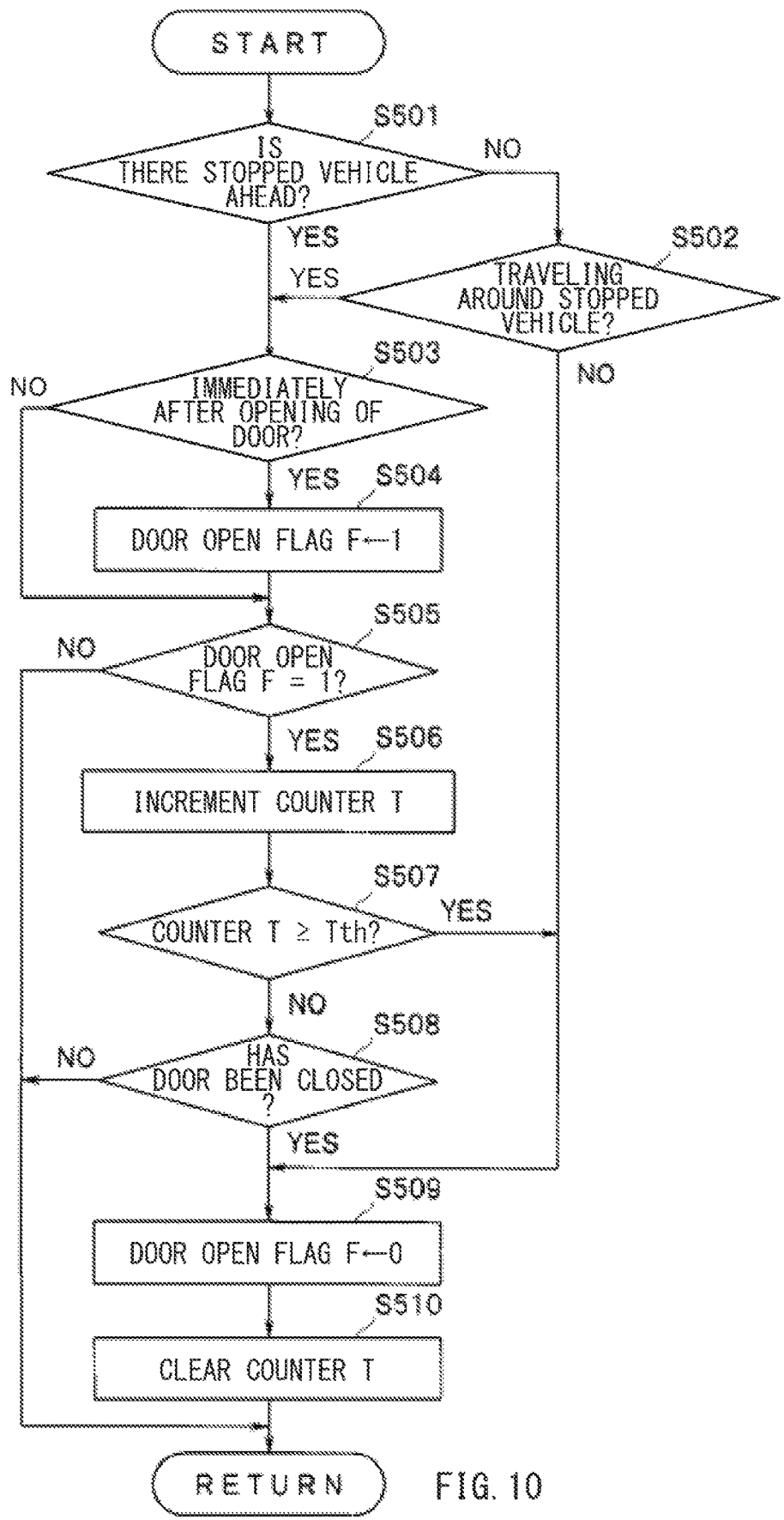
FIG. 10 is a flowchart illustrating a door-open flag setting routine that is executed by the traveling control unit of the traffic control apparatus according to one example embodiment of the technology.

A description is given next of door-open flag setting that is executed by the traveling ECU 73, with reference to a flowchart of a door-open flag setting routine illustrated in FIG. 10. This routine may be executed repeatedly every set cycle by the traveling ECU 73.

Upon start of the routine, the traveling ECU 73 may check, in step S501, whether a stopped vehicle is present ahead on the road on which the target vehicle is traveling, on the basis of the road map information.

If the traveling ECU 73 determines in step S501 that a stopped vehicle is present ahead on the road on which the target vehicle is traveling (step S501: YES), the traveling ECU 73 may cause the flow to proceed to step S503.

If the traveling ECU 73 determines in step S501 that a stopped vehicle is not present ahead on the road on which the target vehicle is traveling (step S501: NO), the traveling ECU 73 may cause the flow to proceed to step S502, and check whether the target vehicle is traveling around the stopped vehicle (e.g., beside the stopped vehicle).

If the traveling ECU 73 determines in step S502 that the target vehicle is not traveling around the stopped vehicle (step S502: NO), the traveling ECU 73 may cause the flow to proceed to step S509. The case where the target vehicle is determined as not traveling around the stopped vehicle may correspond to a case where, in the first place, a stopped vehicle is not present ahead on the road on which the target vehicle is traveling, or a case where the target vehicle is determined as having passed by the stopped vehicle.

If the traveling ECU 73 determines in step S502 that the target vehicle is traveling around the stopped vehicle (step S502: YES), the traveling ECU 73 may cause the flow to proceed to step S503.

When the flow proceeds from step S501 or step S502 to step S503, the traveling ECU 73 may check whether this timing is immediately after opening of a door of the stopped vehicle.

If the traveling ECU 73 determines in step S503 that this timing is not immediately after opening of a door of the stopped vehicle (step S503: NO), or that a door of the stopped vehicle has not been opened in the first place, the traveling ECU 73 may cause the flow to proceed to step S505.

If the traveling ECU 73 determines in step S503 that this timing is immediately after opening of a door of the stopped vehicle (step S503: YES), the traveling ECU 73 may cause the flow to proceed to step S504, set a door open flag F indicating that the door of the stopped vehicle has been opened to "1", and thereafter cause the flow to proceed to step S505.

When the flow proceeds from step S503 or step S504 to step S505, the traveling ECU 73 may check whether the door open flag F has been set to "1".

If the traveling ECU 73 determines in step S505 that the door open flag F has been cleared to "0" (step S505: NO), the traveling ECU 73 may exit the routine.

If the traveling ECU 73 determines in step S505 that the door open flag F has been set to "1" (step S505: YES), the traveling ECU 73 may cause the flow to proceed to step S506, increment a counter T indicating elapsed time from the opening of the door of the stopped vehicle (T←T+1), and thereafter cause the flow to proceed to step S507.

When the flow proceeds from step S506 to step S507, the traveling ECU 73 may check whether the counter T indicating the elapsed time is equal to or greater than a preset counter threshold Tth (e.g., a counter threshold corresponding to about three minutes).

If the traveling ECU 73 determines in step S507 that the counter T is equal to or greater than the counter threshold Tth (step S507: YES), the traveling ECU 73 may cause the flow to proceed to step S509.

If the traveling ECU 73 determines in step S507 that the counter T is less than the counter threshold Tth (step S507: NO), the traveling ECU 73 may cause the flow to proceed to step S508, and check whether the door of the stopped vehicle has been closed.

If the traveling ECU 73 determines in step S508 that the door is still open (step S508: NO), the traveling ECU 73 may exit the routine with the door open flag F kept at "1".

If the traveling ECU 73 determines in step S508 that the door has been closed (step S508: YES), the traveling ECU 73 may cause the flow to proceed to step S509.

When the flow proceeds from step S502 or step S508 to step S509, the traveling ECU 73 may clear the door open flag F to "0", clear the counter T to "0" in subsequent step S510, and thereafter exit the routine.

Figure 11:
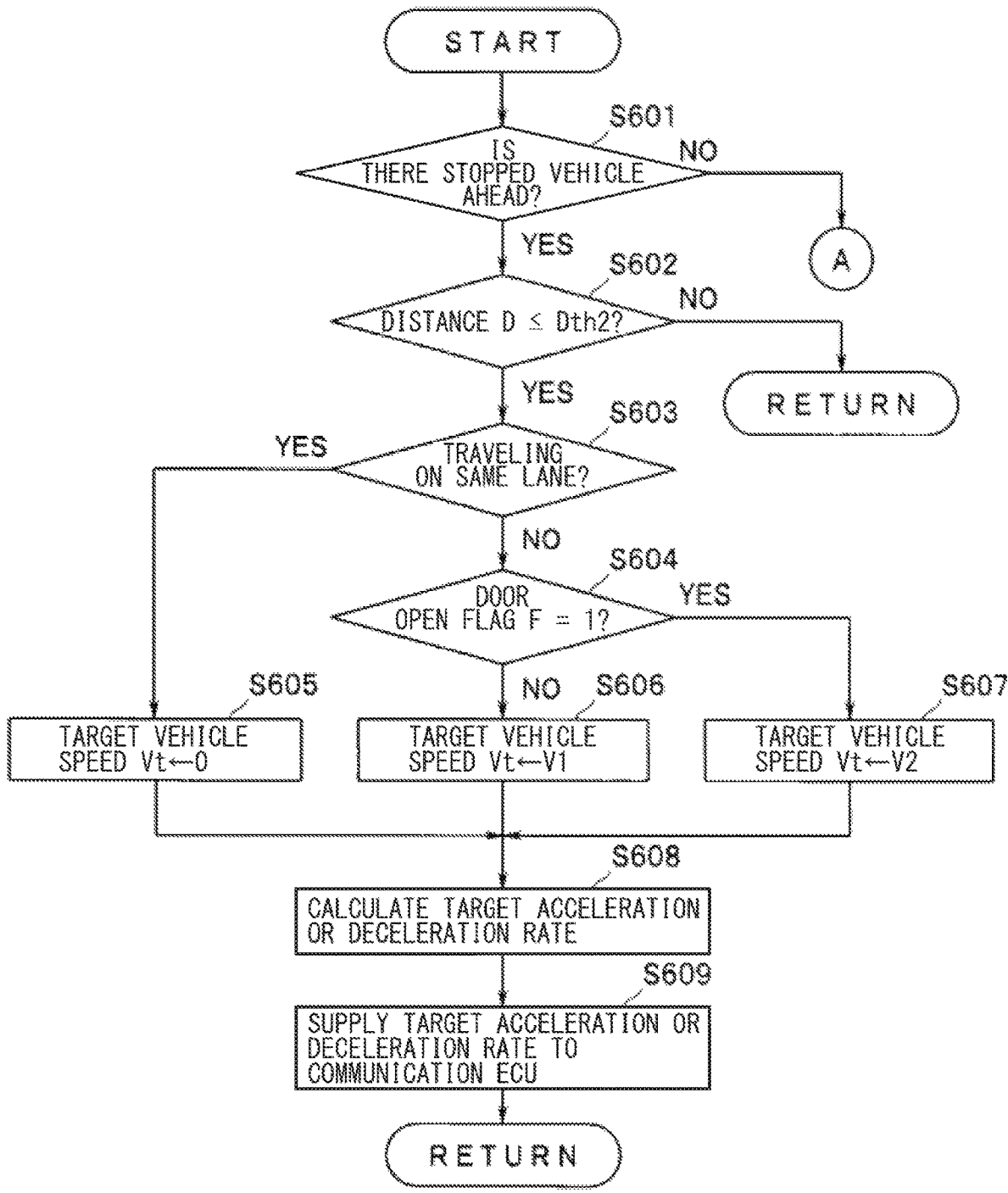
FIG. 11 is a first part of a flowchart illustrating a target acceleration or deceleration rate calculation routine that is executed by the traveling control unit of the traffic control apparatus according to one example embodiment of the technology.
Figure 12:
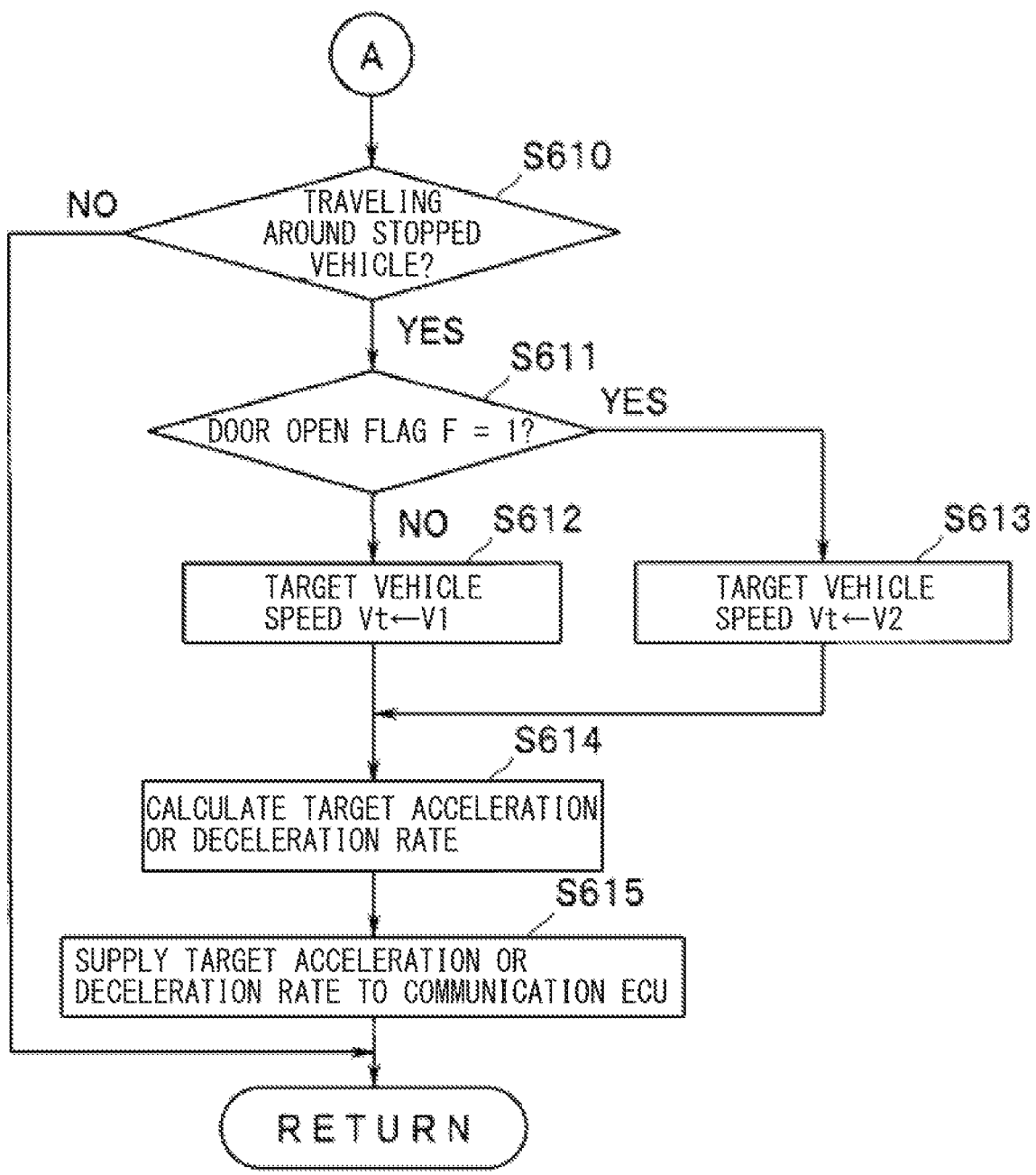
FIG. 12 is a second part of the flowchart illustrating the target acceleration or deceleration rate calculation routine that is executed by the traveling control unit of the traffic control apparatus according to one example embodiment of the technology.

A description is given next of target acceleration or deceleration rate calculation that is executed by the traveling ECU 73, with reference to a flowchart of a target acceleration or deceleration rate calculation routine illustrated in FIGS. 11 and 12. This routine may be executed repeatedly every set cycle.

Upon start of the routine, the traveling ECU 73 may check, in step S601, whether a stopped vehicle is present ahead on the road on which the target vehicle is traveling, on the basis of the road map information.

If the traveling ECU 73 determines in step S601 that a stopped vehicle is not present ahead on the road on which the target vehicle is traveling (step S601: NO), the traveling ECU 73 may cause the flow to proceed to step S610.

If the traveling ECU 73 determines in step S601 that a stopped vehicle is present ahead on the road on which the target vehicle is traveling (step S601: YES), the traveling ECU 73 may cause the flow to proceed to step S602, and check whether the distance D from the target vehicle to the stopped vehicle is equal to or less than the set distance Dth2 (Dth2<Dth1).

If the traveling ECU 73 determines in step S602 that the distance D from the target vehicle to the stopped vehicle is greater than the set distance Dth2 (step S602: NO), the traveling ECU 73 may exit the routine.

If the traveling ECU 73 determines in step S602 that the distance D from the target vehicle to the stopped vehicle is equal to or less than the set distance Dth2 (step S602: YES), the traveling ECU 73 may cause the flow to proceed to step S603, and check whether the target vehicle is traveling on the same lane as the stopped vehicle.

If the traveling ECU 73 determines in step S603 that the target vehicle is traveling on the same lane as the stopped vehicle (step S603: YES), the traveling ECU 73 may cause the flow to proceed to step S605, set a target vehicle speed Vt of the target vehicle to "0", and thereafter cause the flow to proceed to step S608.

If the traveling ECU 73 determines in step S603 that the target vehicle is not traveling on the same lane as the stopped vehicle (step S603: NO), the traveling ECU 73 may cause the flow to proceed to step S604, and check whether the door open flag F has been set to "1".

If the traveling ECU 73 determines in step S604 that the door open flag F has been cleared to "0" (step S604: NO), the traveling ECU 73 may cause the flow to proceed to step S606, set the target vehicle speed Vt to the first set vehicle speed V1, and thereafter cause the flow to proceed to step S608.

If the traveling ECU 73 determines in step S604 that the door open flag F has been set to "1" (step S604: YES), the traveling ECU 73 may cause the flow to proceed to step S607, set the target vehicle speed Vt to the second set vehicle speed V2, and thereafter cause the flow to proceed to step S608.

When the flow proceeds from step S605, step S606, or step S607 to step S608, the traveling ECU 73 may calculate a target acceleration or deceleration rate to be used to set the vehicle speed V of the target vehicle to the target vehicle speed Vt before the distance D between the target vehicle and the stopped vehicle becomes the set distance D0, and thereafter cause the flow to proceed to step S609.

When the flow proceeds from step S608 to step S609, the traveling ECU 73 may supply the calculated target acceleration or deceleration rate to the communication ECU 71, and thereafter exit the routine.

When the flow proceeds from step S601 to step S610, the traveling ECU 73 may check whether the target vehicle is traveling around the stopped vehicle (e.g., beside the stopped vehicle).

If the traveling ECU 73 determines in step S610 that the target vehicle is not traveling around the stopped vehicle (step S610: NO), the traveling ECU 73 may exit the routine. The case where the target vehicle is determined as not traveling around the stopped vehicle may correspond to a case where, in the first place, a stopped vehicle is not present ahead on the road on which the target vehicle is traveling, or a case where the target vehicle is determined as having passed by the stopped vehicle.

If the traveling ECU 73 determines in step S610 that the target vehicle is traveling around the stopped vehicle (step S610: YES), the traveling ECU 73 may cause the flow to proceed to step S611, and check whether the door open flag F has been set to "1".

If the traveling ECU 73 determines in step S611 that the door open flag F has been cleared to "0" (step S611: NO), the traveling ECU 73 may cause the flow to proceed to step S612, set the target vehicle speed Vt to the first set vehicle speed V1, and thereafter cause the flow to proceed to step S614.

If the traveling ECU 73 determines in step S611 that the door open flag F has been set to "1" (step S611: YES), the traveling ECU 73 may cause the flow to proceed to step S613, set the target vehicle speed Vt to the second set vehicle speed V2, and thereafter cause the flow to proceed to step S614.

When the flow proceeds from step S612 or step S613 to step S614, the traveling ECU 73 may calculate a target acceleration or deceleration rate to be used to set the vehicle speed V of the target vehicle to the target vehicle speed Vt, and thereafter cause the flow to proceed to step S615.

When the flow proceeds from step S614 to step S615, the traveling ECU 73 may supply the calculated target acceleration or deceleration rate to the communication ECU 71, and thereafter exit the routine.

According to such an example embodiment, in the vehicle driving control system 1, the traffic control apparatus 70 includes the information recognition ECU 72 and the traveling ECU 73. The information recognition ECU 72 may update the road map information in real time on the basis of the road traffic information and the vehicle information collected from a plurality of vehicles 5 by wireless communication. The traveling ECU 73 calculates control information for a vehicle 5 on the basis of the road map information. In the vehicle driving control system 1, the E/G ECU 23, the PS ECU 24, and the BK ECU 25 of the vehicle 5 executes the driving control on the basis of the control information. In a case where the traveling ECU 73 of the traffic control apparatus 70 determines that a stopped vehicle is present within the set distance (e.g., the set distance Dth2) ahead of the target vehicle and that the target vehicle is able to pass by the stopped vehicle, on the basis of the road map information, the traveling ECU 73 calculates the control information to be used to restrict the vehicle speed V of the target vehicle to equal to or less than the first set vehicle speed V1 until the target vehicle passes by the stopped vehicle. Furthermore, in a case where a door of the stopped vehicle has been opened, the traveling ECU 73 calculates the control information to be used to restrict the vehicle speed V of the target vehicle to equal to or less than the second set vehicle speed V2 lower than the first set vehicle speed V1, until the set time period elapses from the opening of the door or until the target vehicle passes by the stopped vehicle. This makes it possible to perform an appropriate emergency braking control, i.e., an appropriate contact avoidance control, even for a pedestrian's running-out from the stopped vehicle.

Figure 13:
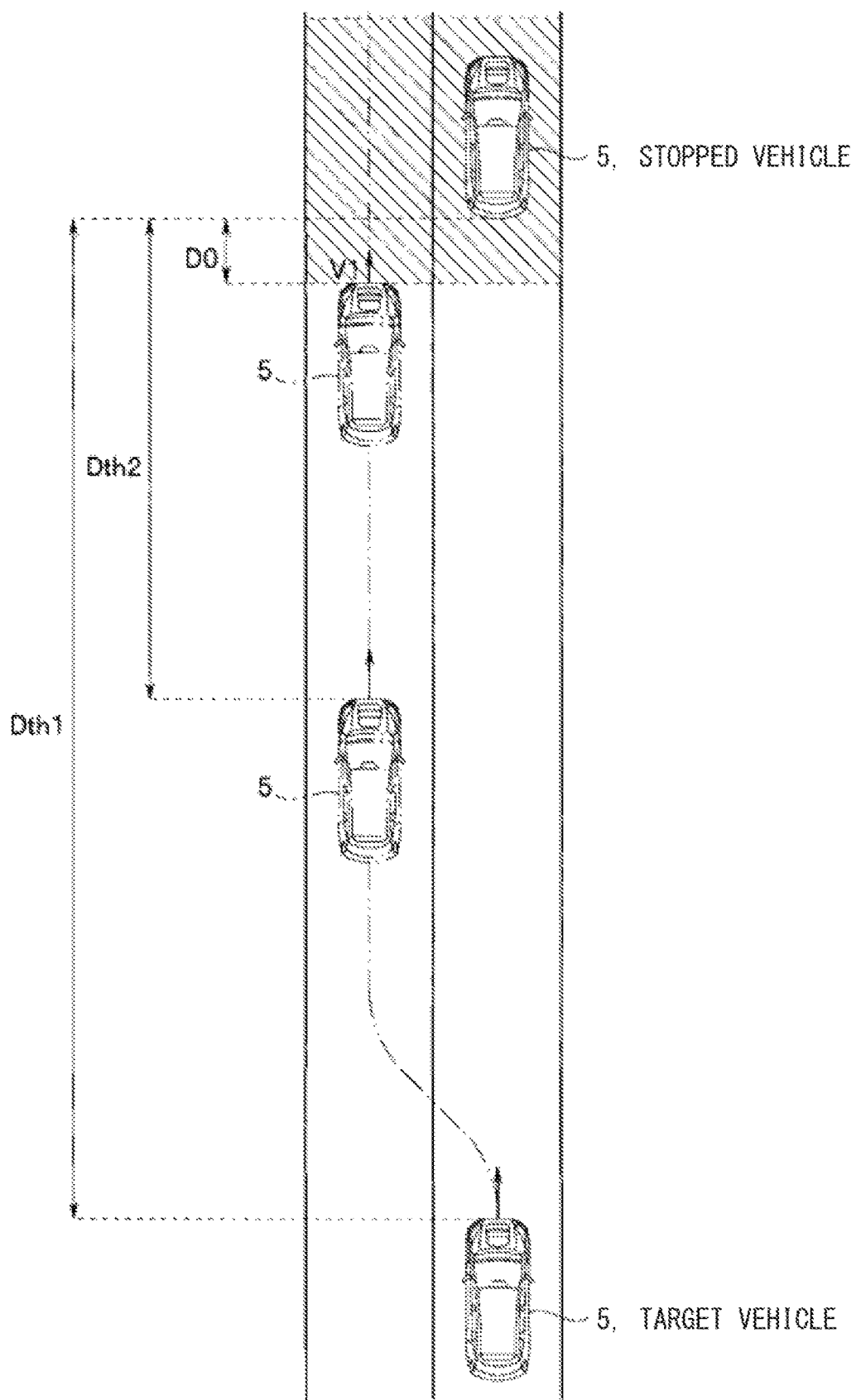
FIG. 13 is an explanatory diagram illustrating a behavior of a target vehicle toward a stopped vehicle according to one example embodiment of the technology.

For example, when the target vehicle passes by the stopped vehicle, as illustrated in FIG. 13, the vehicle speed V of the target vehicle may be restricted to equal to or less than the first set vehicle speed V1 after the distance D between the target vehicle and the stopped vehicle becomes equal to or less than the set distance Dth2, before the distance D becomes the set distance D0. The vehicle speed V may be kept equal to or less than the first set vehicle speed V1 until the target vehicle passes by the stopped vehicle (see a hatched region in FIG. 13). Thus, even in a case where a pedestrian, for example, runs out from behind the stopped vehicle, it is possible to appropriately avoid contact with the pedestrian by the emergency braking control.

Figure 14:
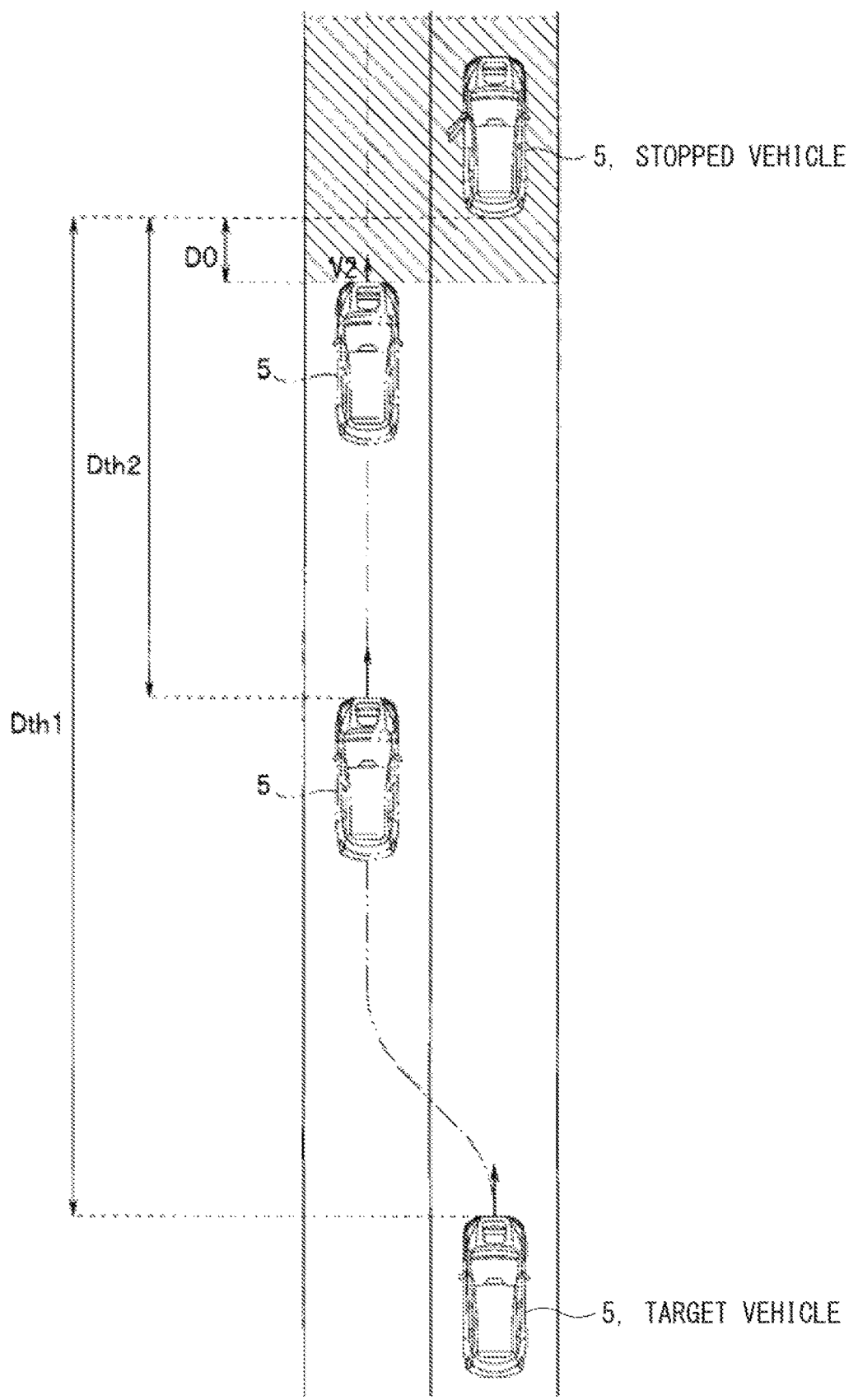
FIG. 14 is an explanatory diagram illustrating a behavior of the target vehicle toward the stopped vehicle according to one example embodiment of the technology.

In addition, for example, in a case where a door of the stopped vehicle has been opened, as illustrated in FIG. 14, it may be predicted that an occupant who has got off the stopped vehicle is likely to suddenly run out in front of the target vehicle as a pedestrian, and the vehicle speed V of the target vehicle may be restricted to equal to or less than the second set vehicle speed V2 lower than the first set vehicle speed V1. Thus, even in a case where the occupant runs out from the stopped vehicle, it is possible to avoid contact with the occupant, i.e., the pedestrian, by the emergency braking control more effectively. In this case, if the set time period elapses from the opening of the door of the stopped vehicle, it may be determined that the occupant is not likely to get off the stopped vehicle, and the traveling at the vehicle speed V equal to or less than the second set vehicle speed V2 may be cancelled (i.e., acceleration may be performed up to the first set vehicle speed V1). This makes it possible to prevent the vehicle speed V from being restricted more than necessary, which helps to reduce the occupant's feeling of strangeness.

For example, in a case where the target vehicle is traveling on the same lane as the stopped vehicle, as illustrated in FIGS. 13 and 14, the target vehicle may be caused to make a lane change when the distance D between the target vehicle and the stopped vehicle becomes equal to or less than the set distance Dth1. This makes it possible to allow the target vehicle to keep traveling.

Figure 15:
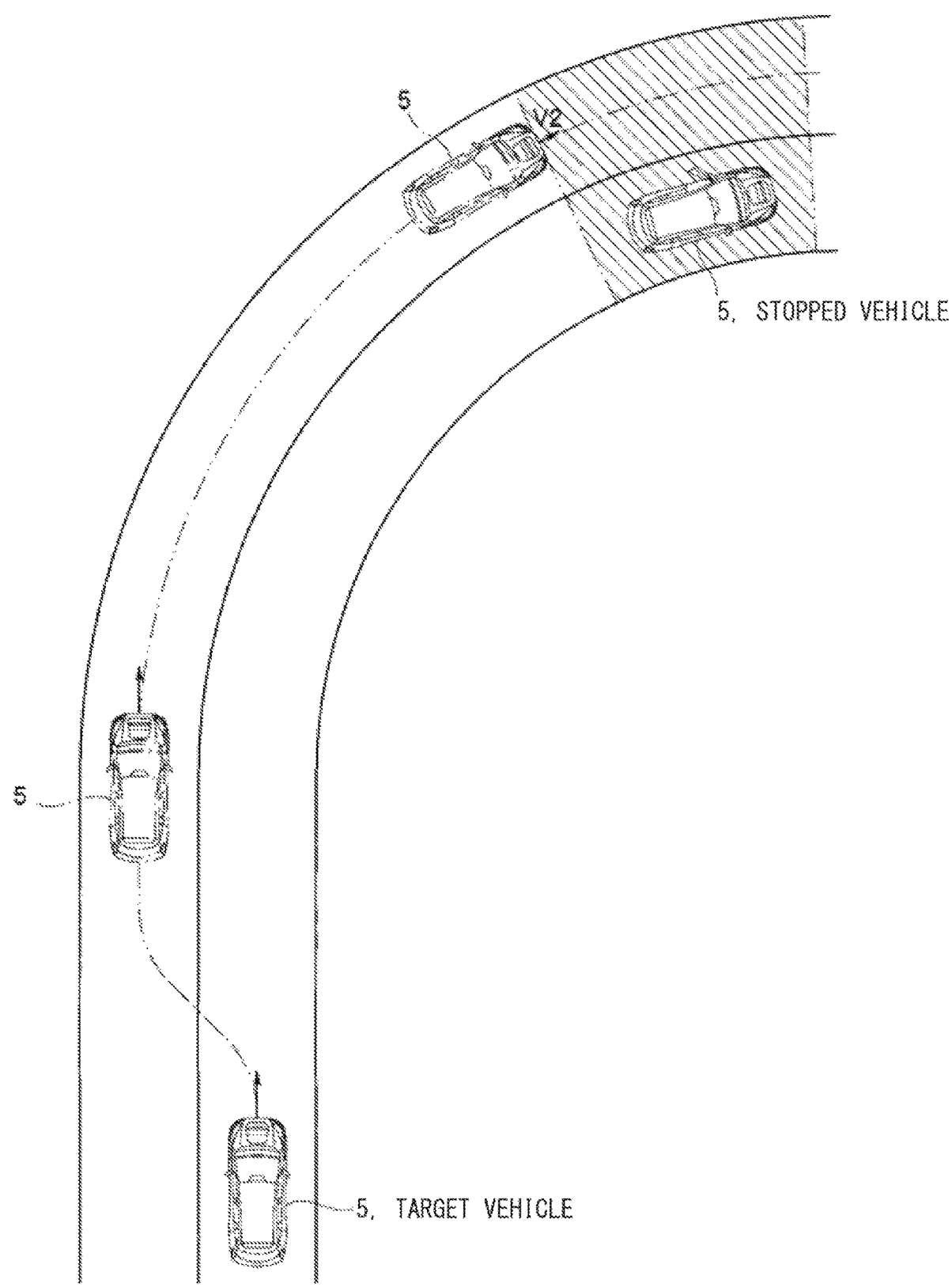
FIG. 15 is an explanatory diagram illustrating a behavior of the target vehicle toward the stopped vehicle according to one example embodiment of the technology.

In these cases, the information recognition ECU 72 of the traffic control apparatus 70 may update the road map information in real time, on the basis of the information collected from, for example, each vehicle 5 and each monitoring apparatus 50 present within the traffic control area. This makes it possible to quickly recognize even information difficult to recognize by only the autonomous sensor provided in the individual vehicles 5. On the basis of the updated road map information, the traveling ECU 73 of the traffic control apparatus 70 calculates the control information for each vehicle 5. This makes it possible to set even the control information for a vehicle 5 traveling on a low-visibility road at an appropriate timing. Therefore, even in a case where a stopped vehicle is present in a low-visibility curve, as illustrated in FIG. 15, for example, it is possible to execute the control of a lane change or vehicle speed restriction on the target vehicle at an appropriate timing.

In the example embodiments described above, the communication ECU 21, the traveling ECU 22, the E/G ECU 23, the PS ECU 24, the BK ECU 25, the alerting ECU 26, the communication ECU 52, the communication ECU 71, the information recognition ECU 72, and the traveling ECU 73 may include a known microcomputer and peripheral equipment thereof. The known microcomputer may include a CPU, a RAM, a ROM, and a nonvolatile storage, for example. The ROM may store, in advance, fixed data such as a program to be executed by the CPU or a data table. All or a part of functions of the communication ECU 21, the traveling ECU 22, the E/G ECU 23, the PS ECU 24, the BK ECU 25, the alerting ECU 26, the communication ECU 52, the communication ECU 71, the information recognition ECU 72, and the traveling ECU 73 may be configured by a logic circuit or an analog circuit. Processing of various programs may be implemented by an electronic circuit such as a FPGA.

The technology described above is not limited to the foregoing example embodiments, and various modifications may be made in the implementation stage without departing from the gist of the technology.

For example, although the foregoing example embodiment describes an example in which the vehicle 5 is mounted with the camera unit 11 including a stereo camera, the technology is not limited thereto. In place of the camera unit including the stereo camera, for example, it is also possible to apply a camera unit including a monocular camera, a millimeter-wave radar, or a light detection and ranging (LiDAR). Similarly, also in the monitoring apparatus 50, it is also possible to apply a camera unit including a stereo camera, a millimeter-wave radar, or a LiDAR, in place of the camera unit 51 including a monocular camera.

Figure 16:
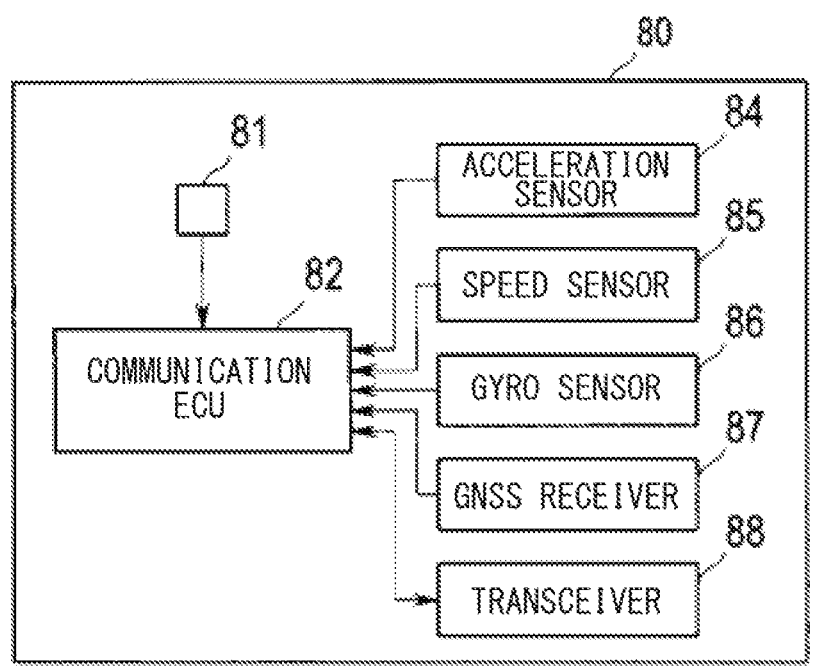
FIG. 16 is a configuration diagram illustrating a part of a communication terminal according to a modification example.

Furthermore, for example, a communication terminal 80, such as a smartphone or a mobile phone, may be used to provide the first road-traffic detection information to the traffic control apparatus 70, as illustrated in FIG. 16. Thus, in one embodiment, the communication terminal 80 may serve as the "mobile body".

In this case, the communication terminal 80 may include a camera unit 81, an acceleration sensor 84, a speed sensor 85, a gyro sensor 86, and a GNSS receiver 87, for example, coupled to a communication ECU 82. The camera unit 81, the acceleration sensor 84, the speed sensor 85, the gyro sensor 86, and the GNSS receiver 87, for example, may serve as the first road-traffic detection information acquisition unit. The communication terminal 80 may also include a transceiver 88 coupled to the communication ECU 82. The transceiver 88 may serve as the first communicator.

Note that the camera unit 81, the acceleration sensor 84, the speed sensor 85, the gyro sensor 86, and the GNSS receiver 87 may correspond to the camera unit 11, the acceleration sensor 14, the speed sensor 15, the gyro sensor 16, and the GNSS receiver 17 according to the foregoing example embodiment. The communication ECU 82 may correspond to the communication ECU 21 according to the foregoing example embodiment. The transceiver 88 may correspond to the transceiver 19 according to the foregoing example embodiment. Therefore, a detailed description of these elements is omitted.

Figure 17:
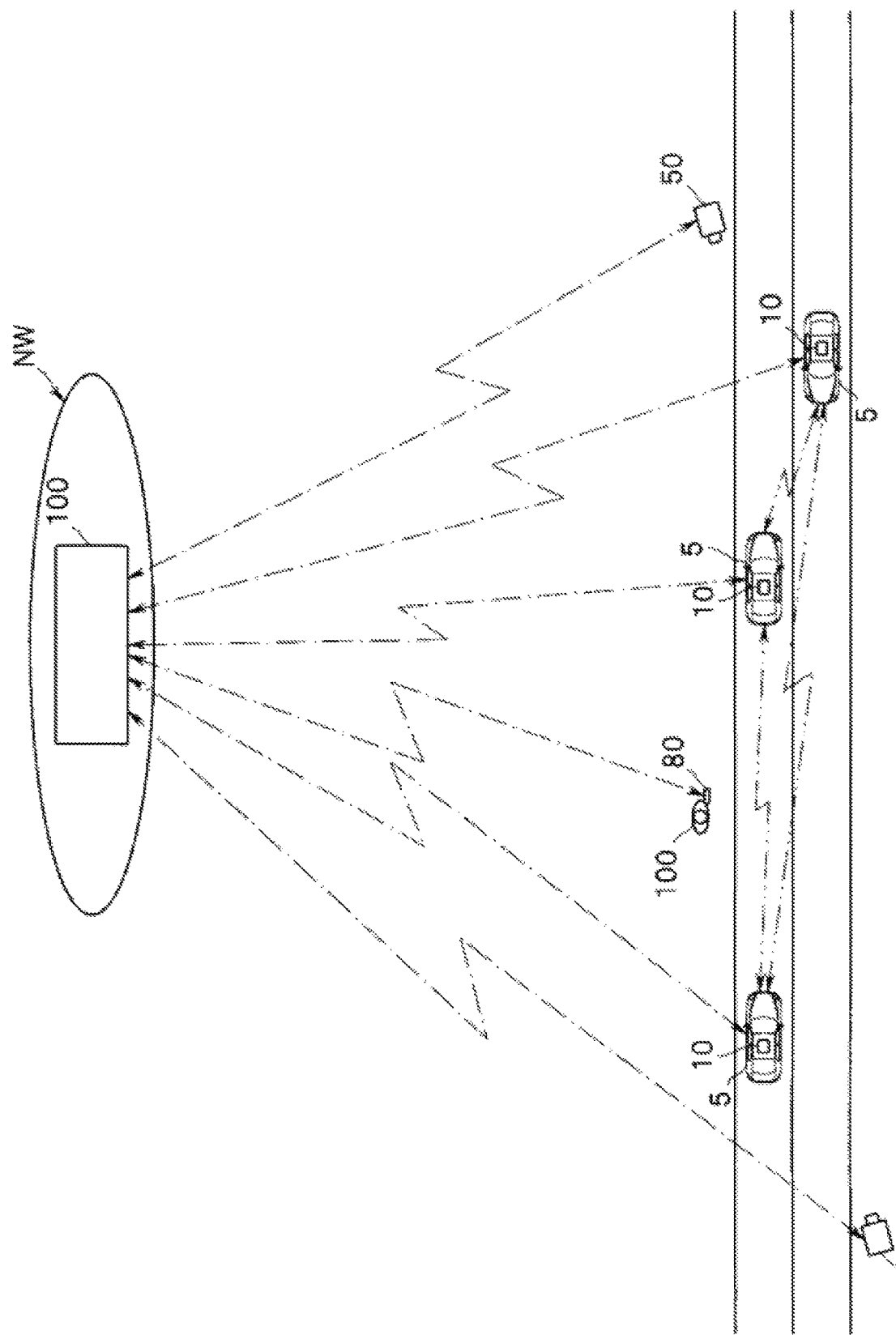
FIG. 17 is an explanatory diagram illustrating vehicle driving control apparatuses, the communication terminal, and monitoring apparatuses coupled to a traffic control apparatus by high-speed wireless communication, according to the modification example.

The communication terminal 80 described above may be held by a pedestrian 100, for example, within the traffic control area, as illustrated in FIG. 17. The communication terminal 80 may thus acquire first road-traffic detection information, and may transmit the acquired first road-traffic detection information to the traffic control apparatus 70.

Figure 18:
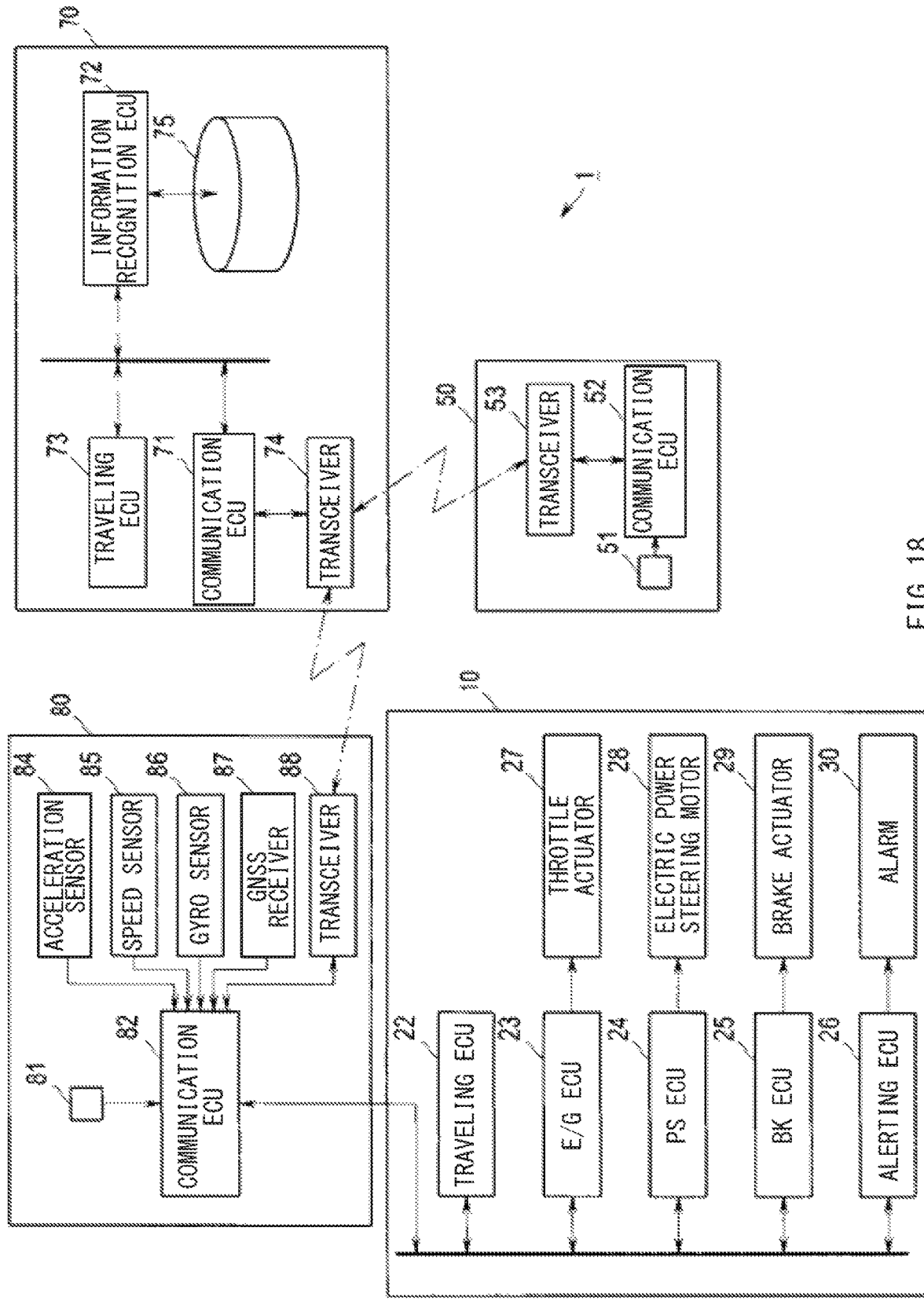
FIG. 18 is an outline configuration diagram illustrating a vehicle driving control system including the communication terminal according to the modification example.

For example, the communication terminal 80 may be applied to the vehicle 5 mounted with the driving control apparatus 10 not including a camera unit or a transceiver, as illustrated in FIG. 18. In this case, the communication terminal 80 fixed to a dashboard, for example, of the vehicle 5 may be coupled to the driving control apparatus 10 via a communication cable, such as a universal serial bus (USB) cable. This enables the communication terminal 80 to acquire first road-traffic detection information, and to transmit the acquired first road-traffic detection information to the traffic control apparatus 70. At this time, the communication terminal 80 may also acquire, via the communication cable, vehicle detection information from an unillustrated door switch, for example, provided in the vehicle 5. The communication terminal 80 may also supply the control information received from the traffic control apparatus 70 to the E/G ECU 23, the PS ECU 24, the BK ECU 25, and the alerting ECU 26.

The foregoing example embodiment describes a configuration in which only control information related to safety of each vehicle is calculated by the traffic control apparatus, and control information of a control for convenience, such as a cruise control, is calculated by the traveling ECU provided in each vehicle. However, the technology is not limited thereto. For example, the traffic control apparatus may be configured to calculate the control information for convenience. In this case, the traveling ECU, for example, provided in the driving control apparatus of each vehicle may be omitted as appropriate.

Conversely, the control information of the control related to the safety of each vehicle and the control information of the control for convenience may be calculated by the traveling ECU provided in each vehicle, on the basis of the road map information that is transmitted from the traffic control apparatus 70. In this case, the road map information that is transmitted from the traffic control apparatus 70 to each vehicle may be limited to only the road map information to be used to calculate the control information by the traveling ECU of each vehicle, as described above. The road map information thus limited may include vehicle information indicating an open/closed state of a door.

As described above, in one embodiment, the traveling ECU 22 provided in the driving control apparatus 10 of the vehicle 5 may serve as a "mobile-body-side control information calculation unit", and the traveling ECU 73 provided in the traffic control apparatus 70 may serve as a "traffic-control-side control information calculation unit".

Figure 19:
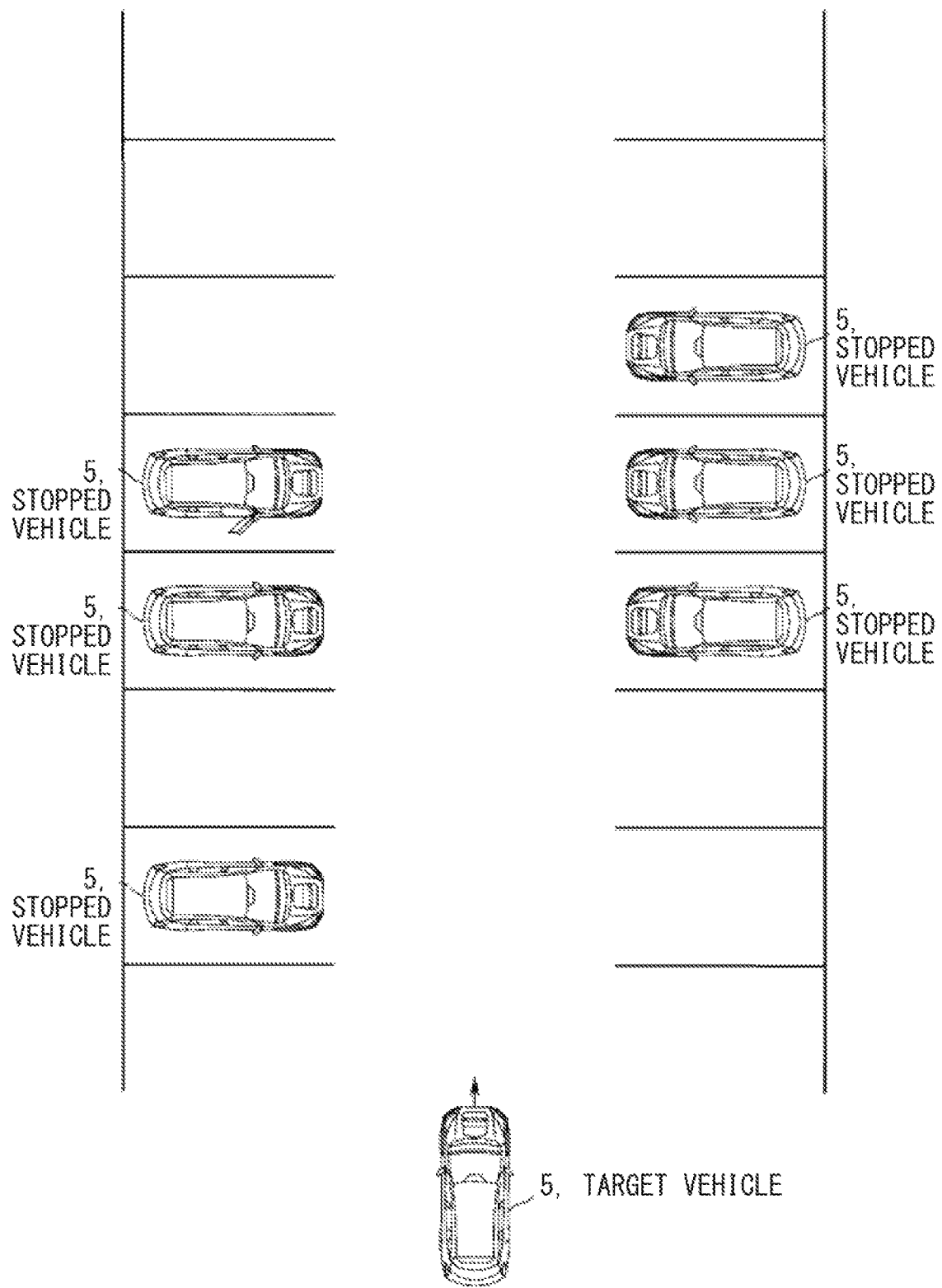
FIG. 19 is an explanatory diagram illustrating a behavior of a target vehicle toward a stopped vehicle in a parking lot according to a modification example.

In addition, the control of passing by the stopped vehicle that is performed by the driving control system 1 is not limited to the control on a road. For example, the control may also be applied to a case where the target vehicle passes by the stopped vehicle (e.g., the front of the stopped vehicle) in a parking lot, as illustrated in FIG. 19. A control in the parking lot may be regarded as a control on a road in a broad sense. It is thus apparent that the lane change control, i.e., the steering control, avoiding the stopped vehicle is not necessarily performed.

Figure 20:
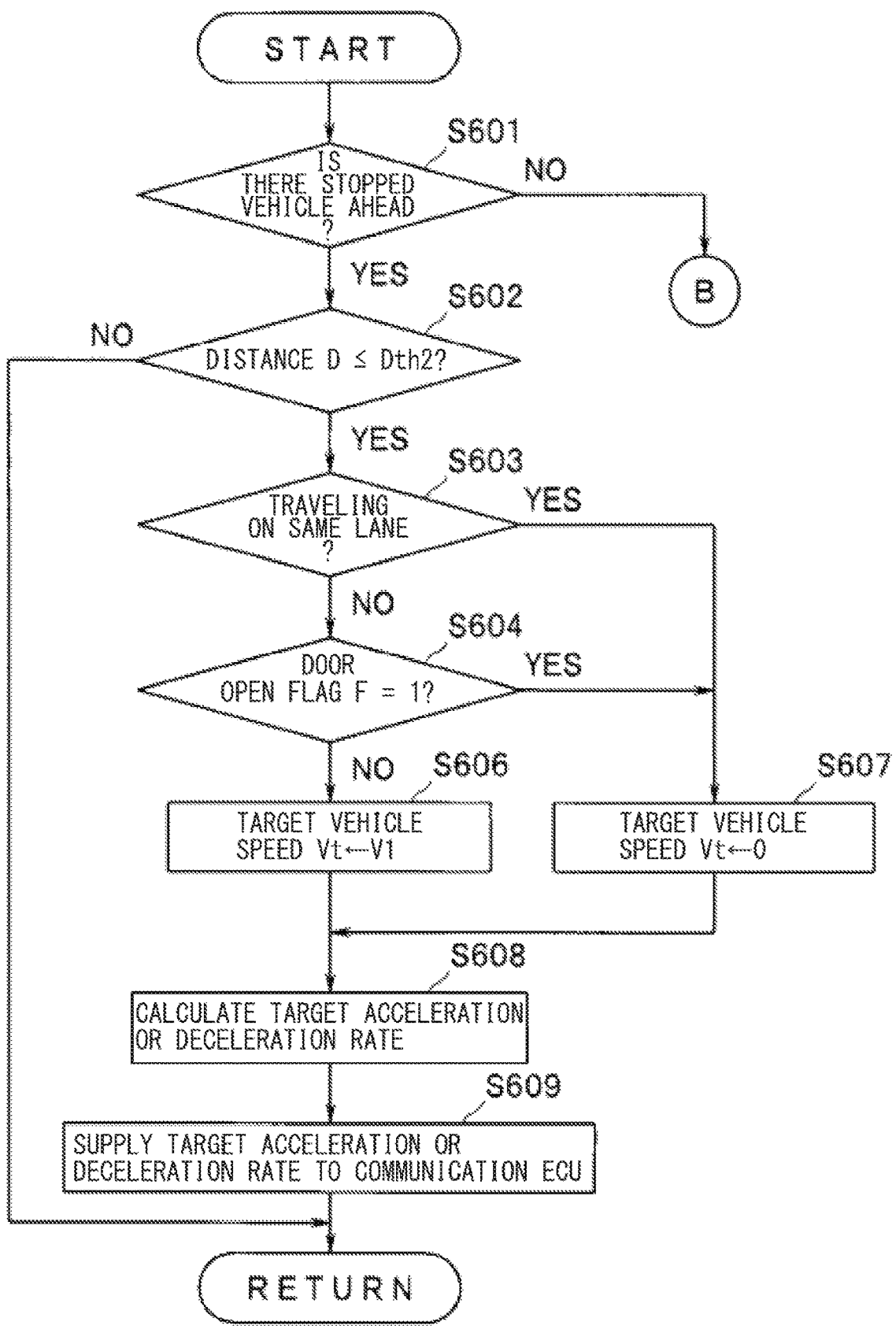
FIG. 20 is a first part of a flowchart illustrating a target acceleration or deceleration rate calculation routine that is executed by a traveling control unit of a traffic control apparatus according to one example embodiment of the technology.
Figure 21:
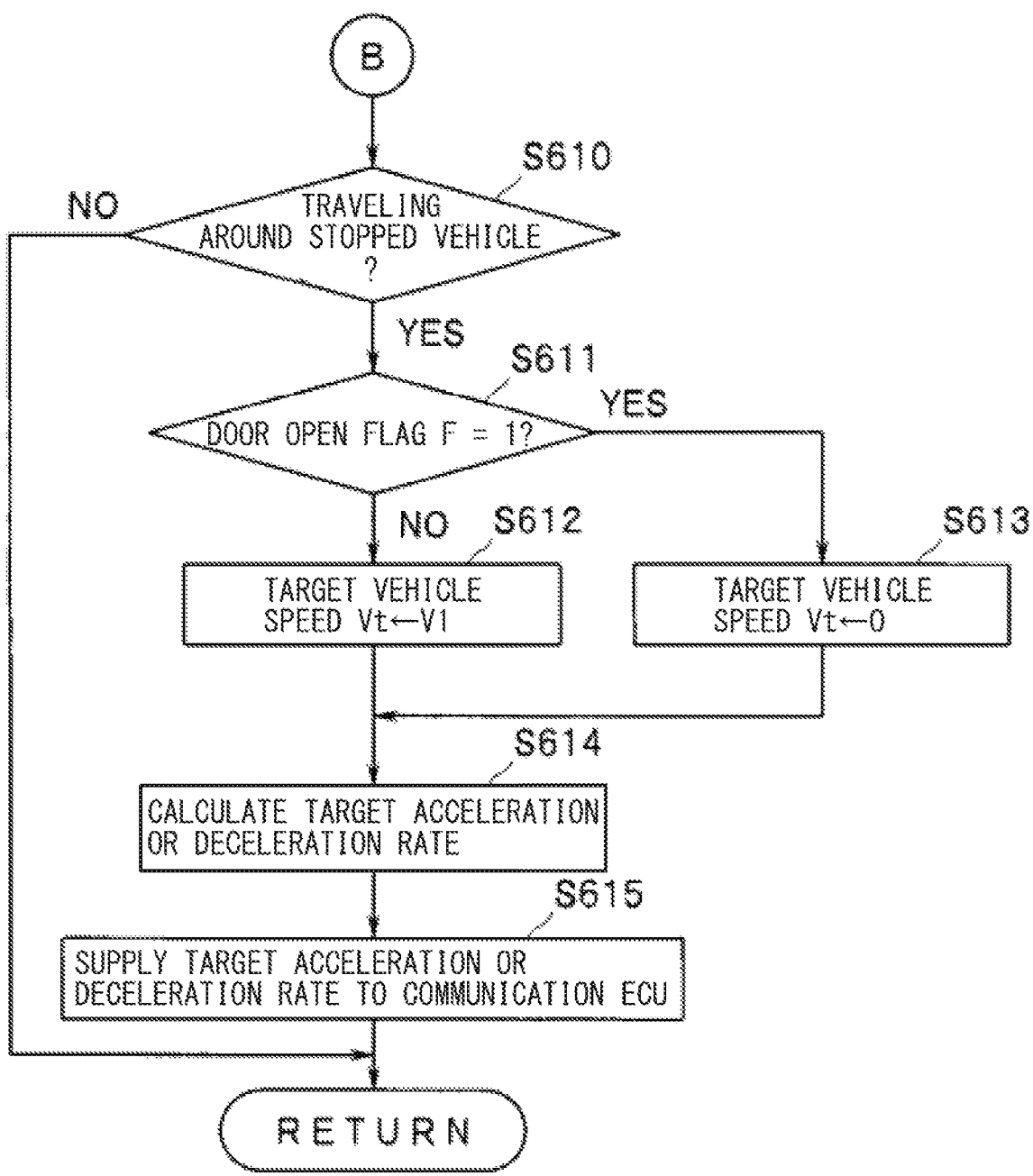
FIG. 21 is a second part of the flowchart illustrating the target acceleration or deceleration rate calculation routine that is executed by the traveling control unit of the traffic control apparatus according to one example embodiment of the technology.

A description is given next of a second example embodiment of the technology, with reference to FIG. 20 and FIG. 21. Elements similar to those in the first example embodiment described above are denoted with the same reference signs, and descriptions thereof are omitted as appropriate.

In a case where a door of the stopped vehicle has been opened, the example embodiment may cause the target vehicle to stop, regardless of whether the target vehicle is traveling on the same lane as the stopped vehicle or is traveling on another lane.

A description is given of such a control with reference to, for example, a flowchart of a target acceleration or deceleration rate calculation routine illustrated in FIGS. 20 and 21. This routine may be executed repeatedly every set cycle.

Upon start of the routine, the traveling ECU 73 may check, in step S601, whether a stopped vehicle is present ahead on the road on which the target vehicle is traveling, on the basis of the road map information.

If the traveling ECU 73 determines in step S601 that a stopped vehicle is not present ahead on the road on which the target vehicle is traveling (step S601: NO), the traveling ECU 73 may cause the flow to proceed to step S610.

If the traveling ECU 73 determines in step S601 that a stopped vehicle is present ahead on the road on which the target vehicle is traveling (step S601: YES), the traveling ECU 73 may cause the flow to proceed to step S602, and check whether the distance D from the target vehicle to the stopped vehicle is equal to or less than the set distance Dth2 (Dth2<Dth1).

If the traveling ECU 73 determines in step S602 that the distance D from the target vehicle to the stopped vehicle is greater than the set distance Dth2 (step S602: NO), the traveling ECU 73 may exit the routine.

If the traveling ECU 73 determines in step S602 that the distance D from the target vehicle to the stopped vehicle is equal to or less than the set distance Dth2 (step S602: YES), the traveling ECU 73 may cause the flow to proceed to step S603, and check whether the target vehicle is traveling on the same lane as the stopped vehicle.

If the traveling ECU 73 determines in step S603 that the target vehicle is traveling on the same lane as the stopped vehicle (step S603: YES), the traveling ECU 73 may cause the flow to proceed to step S607.

If the traveling ECU 73 determines in step S603 that the target vehicle is not traveling on the same lane as the stopped vehicle (step S603: NO), the traveling ECU 73 may cause the flow to proceed to step S604, and check whether the door open flag F has been set to "1".

If the traveling ECU 73 determines in step S604 that the door open flag F has been cleared to "0" (step S604: NO), the traveling ECU 73 may cause the flow to proceed to step S606, set the target vehicle speed Vt to the first set vehicle speed V1, and thereafter cause the flow to proceed to step S608.

If the traveling ECU 73 determines in step S604 that the door open flag F has been set to "1" (step S604: YES), the traveling ECU 73 may cause the flow to proceed to step S607.

When the flow proceeds from step S603 or step S604 to step S607, the traveling ECU 73 may set the target vehicle speed Vt to the second set vehicle speed V2, and thereafter cause the flow to proceed to step S608. In the example embodiment, the second set vehicle speed V2 may be set to "0".

When the flow proceeds from step S606 or step S607 to step S608, the traveling ECU 73 may calculate a target acceleration or deceleration rate to be used to set the vehicle speed V of the target vehicle to the target vehicle speed Vt before the distance D between the target vehicle and the stopped vehicle becomes the set distance D0, and thereafter cause the flow to proceed to step S609.

In other words, in the example embodiment, in a case where the target vehicle is traveling on the same lane as the stopped vehicle, and a case where the door open flag F has been set to "1", the target acceleration or deceleration rate to be used to cause the target vehicle to stop before the distance D between the target vehicle and the stopped vehicle becomes the set distance D0 may be calculated.

When the flow proceeds from step S608 to step S609, the traveling ECU 73 may supply the calculated target acceleration or deceleration rate to the communication ECU 71, and thereafter exit the routine.

When the flow proceeds from step S601 to step S610, the traveling ECU 73 may check whether the target vehicle is traveling around the stopped vehicle (e.g., beside the stopped vehicle).

If the traveling ECU 73 determines in step S610 that the target vehicle is not traveling around the stopped vehicle (step S610: NO), the traveling ECU 73 may exit the routine. The case where the target vehicle is determined as not traveling around the stopped vehicle may correspond to a case where, in the first place, a stopped vehicle is not present ahead on the road on which the target vehicle is traveling, or a case where the target vehicle is determined as having passed by the stopped vehicle.

If the traveling ECU 73 determines in step S610 that the target vehicle is traveling around the stopped vehicle (step S610: YES), the traveling ECU 73 may cause the flow to proceed to step S611, and check whether the door open flag F has been set to "1".

If the traveling ECU 73 determines in step S611 that the door open flag F has been cleared to "0" (step S611: NO), the traveling ECU 73 may cause the flow to proceed to step S612, set the target vehicle speed Vt to the first set vehicle speed V1, and thereafter cause the flow to proceed to step S614.

If the traveling ECU 73 determines in step S611 that the door open flag F has been set to "1" (step S611: YES), the traveling ECU 73 may cause the flow to proceed to step S613, set the target vehicle speed Vt to the second set vehicle speed V2, and thereafter cause the flow to proceed to step S614. In the example embodiment, the second set vehicle speed V2 may be set to "0".

When the flow proceeds from step S612 or step S613 to step S614, the traveling ECU 73 may calculate a target acceleration or deceleration rate to be used to set the vehicle speed V of the target vehicle to the target vehicle speed Vt, and thereafter cause the flow to proceed to step S615.

When the flow proceeds from step S614 to step S615, the traveling ECU 73 may supply the calculated target acceleration or deceleration rate to the communication ECU 71, and thereafter exit the routine.

According to such an example embodiment, in a case where a door of the stopped vehicle has been opened, the control of causing the target vehicle to stop until the set time period elapses from the opening of the door may intervene, regardless of whether the target vehicle is traveling on the same lane as the stopped vehicle or is traveling on another lane.

This makes it possible to achieve more appropriate contact avoidance for a pedestrian's running-out from the stopped vehicle.

Figure 22:
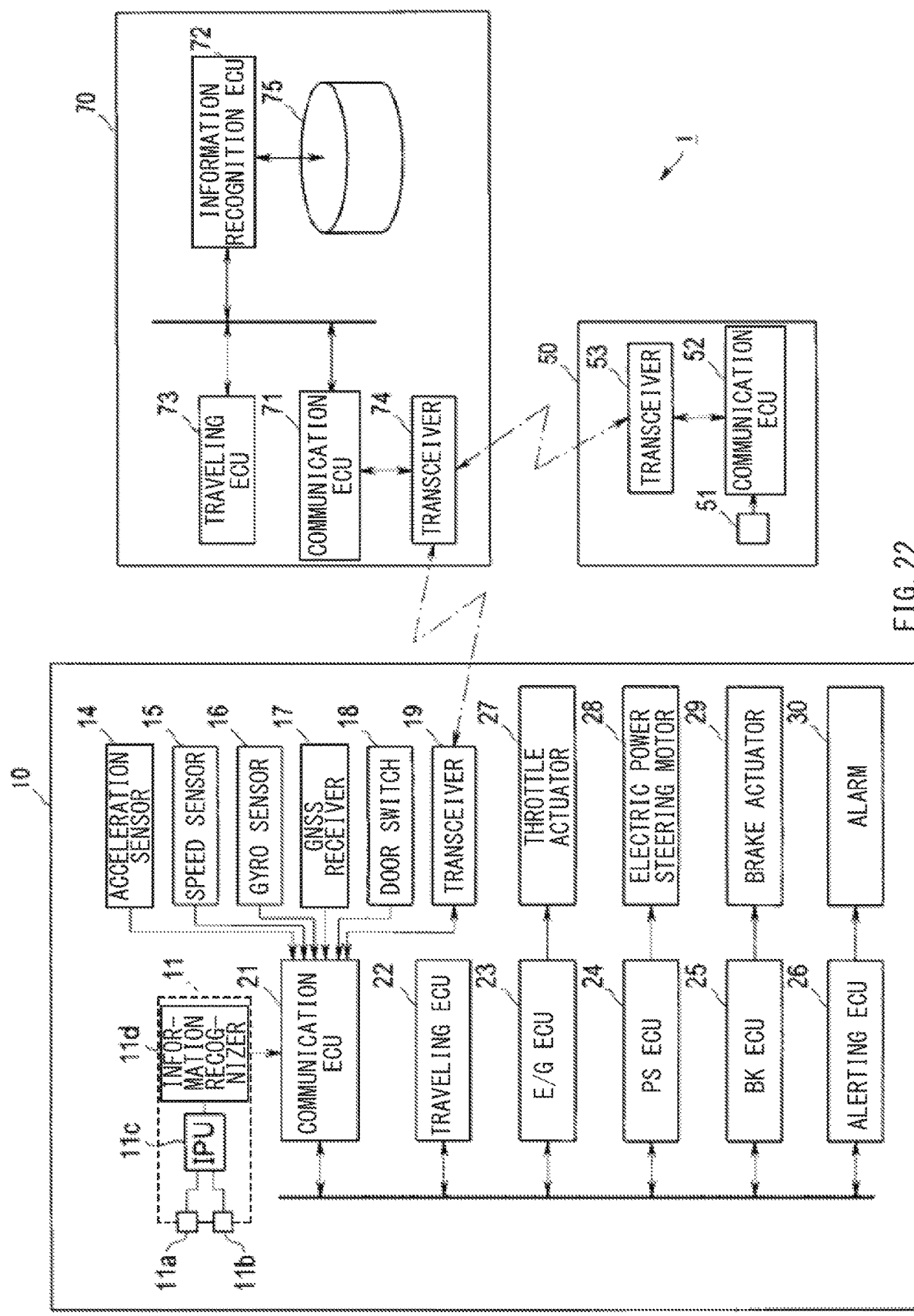
FIG. 22 is an outline configuration diagram illustrating a vehicle driving control system according to one example embodiment of the technology.
Figure 23:
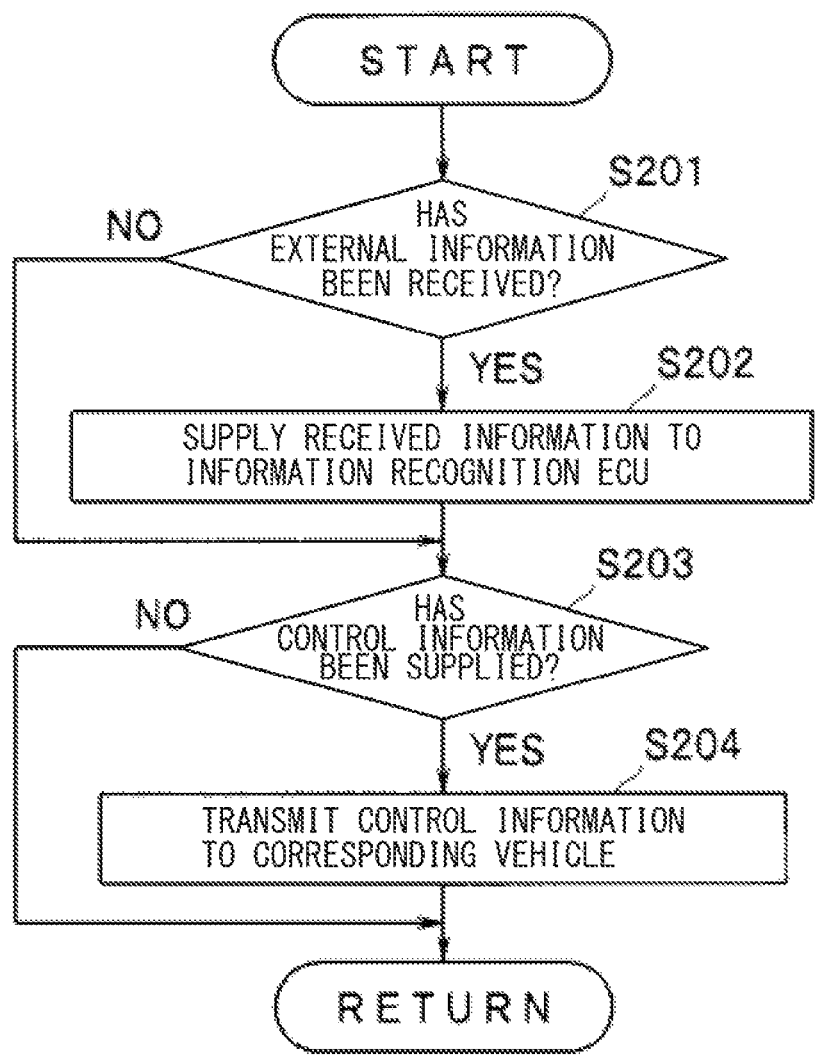
FIG. 23 is a flowchart illustrating a communication control routine that is executed by a communication control unit of a traffic control apparatus according to one example embodiment of the technology.

A description is given next of a third example embodiment of the technology, with reference to FIGS. 22 and 23. Elements similar to those in the first example embodiment described above are denoted with the same reference signs, and descriptions thereof are omitted as appropriate.

The example embodiment may reduce information that is transmitted from the transceiver 74 of the traffic control apparatus 70 to the transceiver 19 of the driving control apparatus 10.

In one example, the information that is transmitted from the transceiver 74 of the traffic control apparatus 70 to the transceiver 19 of the driving control apparatus 10 in the example embodiment may be only control information related to ensuring of safety of the vehicle 5.

In other words, in the example embodiment, road map information may not be transmitted from the transceiver 74 to the transceiver 19. For example, as illustrated in FIG. 23, the communication ECU 71 of the traffic control apparatus 70 may perform only the processes of step S201 to step S204 according to the first example embodiment described above.

Accordingly, for example, in the vehicle 5 configured to perform a driving assistance control for an improvement in convenience, the camera unit 11 may include an information recognizer 11d that recognizes road traffic information on the basis of the distance image information generated by the IPU 11c.

For example, the information recognizer 11d may calculate, on the basis of the distance image information, lane lines that divide a road around the vehicle 5, and calculate a road curvature of lane lines that define right and left of the traveling course, and a lane width, for example. The information recognizer 11d may also perform a process of recognizing various three-dimensional objects by performing predetermined pattern matching, for example, on the distance image information.

The road traffic information thus recognized by the information recognizer 11d may be supplied to the traveling ECU 22. The traveling ECU 22 may calculate, for example, control information for the adaptive cruise control and the lane keep control, on the basis of the road traffic information supplied from the information recognizer 11d.

In the example embodiment in which road traffic information is not transmitted from the traffic control apparatus 70, as elements for recognition of the road traffic information, it is possible to provide an autonomous sensor, such as a millimeter-wave radar or a laser radar, and a locator unit, for example, as appropriate, in addition to the camera unit 11 or in place of the camera unit 11. The locator unit may include road map information independent of the road map information of the traffic control apparatus 70.

According to such an example embodiment, the information that is transmitted from the transceiver 74 of the traffic control apparatus 70 to the transceiver 19 of the vehicle 5 may be limited to the control information for the ensuring of safety of the vehicle 5. This makes it possible to significantly reduce the communication load from the transceiver 74 to the transceiver 19. This enables the control information with high precision calculated by the traveling ECU 73 of the traffic control apparatus 70 to be instantaneously transmitted to the target vehicle 5, making it possible to achieve the control for the ensuring of safety of the vehicle 5 at a higher level.

In other words, for example, even in a case where traveling control based on the control information calculated by the traveling ECU 22 of the driving control apparatus 10 is being executed, it is possible to quickly execute, as an interrupt control, the traveling control in passing by a stopped vehicle and the contact avoidance control for an obstacle based on the control information transmitted from the traffic control apparatus 70.

Note that the configurations described in the foregoing example embodiments and modification examples may be combined as appropriate. In a case where the above-described concerns may be addressed and the above-described effects may be obtained even if some features are deleted from all the features disclosed in the foregoing example embodiments and modification examples, the remaining features may be extracted as a technology.

Each of the E/G ECU 23, the PS ECU 24, the BK ECU 25, the information recognition ECU 72, and the traveling ECU 73 illustrated in FIGS. 1, 18, and 22 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the E/G ECU 23, the PS ECU 24, the BK ECU 25, the information recognition ECU 72, and the traveling ECU 73. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the E/G ECU 23, the PS ECU 24, the BK ECU 25, the information recognition ECU 72, and the traveling ECU 73 illustrated in FIGS. 1, 18, and 22.

The invention claimed is:

1. A vehicle driving control system comprising:
    a road map information updating unit configured to update road map information in real time, on a basis of road traffic information and mobile body information, or both collected from a mobile body by wireless communication, the mobile body including a first vehicle and a second vehicle stopped within a set distance ahead of the first vehicle, the road map information including information that indicate i) a position of the second vehicle and ii) whether a door of the second vehicle is open or closed; and
    a control information calculation unit configured to calculate control information for the first vehicle on a basis of the road map information; and
    a driving control execution unit configured to perform a driving control of the first vehicle on a basis of the control information, wherein
    the control information calculation unit is configured to:
        determine, on the basis of the road map information, whether the first vehicle is able to pass by the second vehicle;
        after determining that the first vehicle is able to pass by the second vehicle, determine whether the door of the second vehicle is open or closed on the basis of the road map information;
        in response to determining that the door of the second vehicle is closed, calculate the control information to be used to restrict a vehicle speed of the first vehicle to equal to or less than a first set vehicle speed until the first vehicle passes by the second vehicle;
        in response to determining that the door of the second vehicle is open, calculate the control information to be used to restrict the vehicle speed of the first vehicle to equal to or less than a second set vehicle speed until the first vehicle passes by the second vehicle, the second set vehicle speed being lower than the first set vehicle speed; and cancel the second set vehicle speed in a case where a predetermined time period elapses for a time of opening the door of the second vehicle.

2. The vehicle driving control system according to claim 1,
wherein the control information calculation unit is configured to calculate, in a case where a traveling lane on which the first vehicle is traveling is same as a lane on which the second vehicle is present and where an adjacent lane on which the first vehicle is able to travel is provided together with the traveling lane, the control information to be used to cause the first vehicle to make a lane change to the adjacent lane.

3. The vehicle driving control system according to claim 2, further comprising:
an information acquisition unit provided to be in the mobile body and configured to acquire road-traffic detection information, mobile-body detection information, or both;
a mobile-body-side communicator to be provided in the mobile body; and
a traffic-control-side communicator to be provided in a traffic control apparatus disposed for each traffic control area, wherein
the road map information updating unit and the control information calculation unit are provided in the traffic control apparatus, and
the road map information updating unit is configured to recognize the road traffic information, the mobile body information, or both on a basis of the road-traffic detection information, the mobile-body detection information, or both received by the traffic-control-side communicator through the mobile-body-side communicator.

4. The vehicle driving control system according to claim 2, further comprising:
an information acquisition unit to be provided in the mobile bod and configured to acquire road-traffic detection information, mobile-body detection information, or both;
a mobile-body-side communicator to be provided in the mobile body; and
a traffic-control-side communicator to be provided in a traffic control apparatus disposed for each traffic control area, wherein:
the road map information updating unit is to be provided in the traffic control apparatus, and configured to recognize the road traffic information, the mobile body information, or both on a basis of the road-traffic detection information, the mobile-body detection information, or both received by the traffic-control-side communicator through the mobile-body-side communicator,
the control information calculation unit includes at least one of a traffic-control-side control information calculation unit or a mobile-body-side control information calculation unit, the traffic-control-side control information calculation unit being to be provided in the traffic control apparatus and configured to calculate the control information on a basis of the road traffic information, the mobile body information, or both, the mobile-body-side control information calculation unit being provided in the first vehicle and configured to calculate the control information on a basis of the road traffic information, the mobile body information, or both received by the mobile-body-side communicator through the traffic-control-side communicator, and
the driving control execution unit is configured to perform the driving control on a basis of one or both of the control information calculated by the traffic-control-side control information calculation unit and the control information calculated by the mobile-body-side control information calculation unit.

5. The vehicle driving control system according to claim 1, further comprising:
an information acquisition unit provided to be in the mobile body and configured to acquire road-traffic detection information, mobile-body detection information, or both;
a mobile-body-side communicator to be provided in the mobile body; and
a traffic-control-side communicator to be provided in a traffic control apparatus disposed for each traffic control area, wherein
the road map information updating unit and the control information calculation unit are provided in the traffic control apparatus, and
the road map information updating unit is configured to recognize the road traffic information, the mobile body information, or both on a basis of the road-traffic detection information, the mobile-body detection information, or both received by the traffic-control-side communicator through the mobile-body-side communicator.

6. The vehicle driving control system according to claim 1, further comprising:
an information acquisition unit to be provided in the mobile bod and configured to acquire road-traffic detection information, mobile-body detection information, or both;
a mobile-body-side communicator to be provided in the mobile body; and
a traffic-control-side communicator to be provided in a traffic control apparatus disposed for each traffic control area, wherein:
the road map information updating unit is to be provided in the traffic control apparatus, and configured to recognize the road traffic information, the mobile body information, or both on a basis of the road-traffic detection information, the mobile-body detection information, or both received by the traffic-control-side communicator through the mobile-body-side communicator,
the control information calculation unit includes at least one of a traffic-control-side control information calculation unit or a mobile-body-side control information calculation unit, the traffic-control-side control information calculation unit being to be provided in the traffic control apparatus and configured to calculate the control information on a basis of the road traffic information, the mobile body information, or both, the mobile-body-side control information calculation unit being provided in the first vehicle and configured to calculate the control information on a basis of the road traffic information, the mobile body information, or both received by the mobile-body-side communicator through the traffic-control-side communicator, and
the driving control execution unit is configured to perform the driving control on a basis of one or both of the control information calculated by the traffic-control-side control information calculation unit and the control information calculated by the mobile-body-side control information calculation unit.

7. A vehicle driving control system comprising:

a first circuitry configured to:

update road map information in real time, on a basis of road traffic information and mobile body information, collected from a mobile body by wireless communication, the mobile body including a first vehicle and a second vehicle stopped within a set distance ahead of the first vehicle, the road map information including information that indicate i) a position of the second vehicle and ii) whether a door of the second vehicle is open or closed; and calculate control information for the first vehicle on a basis of the road map information, and a second circuitry configured to perform a driving control of the first vehicle on a basis of the control information, wherein the first circuitry is configured to:

determine, on the basis of the road map information, whether the first vehicle is able to pass by the second vehicle;

after determining that the first vehicle is able to pass by the second vehicle, determine whether the door of the second vehicle is open or closed on the basis of the road map information;

in response to determining that the door of the second vehicle is closed, calculate the control information to be used to restrict a vehicle speed of the first vehicle to equal to or less than a first set vehicle speed until the first vehicle passes by the second vehicle;

in response to determining that the door of the second vehicle is open, calculate the control information to be used to restrict the vehicle speed of the first vehicle to equal to or less than a second set vehicle speed until the first vehicle passes by the second vehicle, the second set vehicle speed being lower than the first set vehicle speed; and cancel the second set vehicle speed in a case where a predetermined time period elapses from a time of opening the door of the second vehicle.

8. A vehicle driving control system comprising:

a first circuitry configured to:

update road map information in real time, on a basis of road traffic information and mobile body information, collected from a mobile body by wireless communication, the mobile body including a first vehicle and a second vehicle stopped within a set distance ahead of the first vehicle, the road map information including information that indicate i) a position of the second vehicle and ii) whether a door of the second vehicle is open or closed; and calculate control information for the first vehicle on a basis of the road map information, and a second circuitry configured to perform a driving control of the first vehicle on a basis of the control information, wherein the first circuitry is configured to:

determine, on the basis of the road map information, whether the first vehicle is able to pass by the second vehicle;

after determining that the first vehicle is able to pass by the second vehicle, determine whether the door of the second vehicle is open or closed on the basis of the road map information;

in response to determining that the door of the second vehicle is closed, calculate the control information to be used to restrict a vehicle speed of the first vehicle to equal to or less than a first set vehicle speed until the first vehicle passes by the second vehicle;

in response to determining that the door of the second vehicle is open, determine whether a predetermined time period elapses from a time of opening the door of the second vehicle;

in response to determining that the predetermined time period elapses from the time of opening the door of the second vehicle, calculate the control information to be used to restrict the vehicle speed of the first vehicle to equal to or less than the first set vehicle speed until the first vehicle passes by the second vehicle; and in response to determining that the predetermined time period does not elapse from the time of opening the door of the second vehicle, calculate the control information to be used to restrict the vehicle speed of the first vehicle to equal to or less than a second set vehicle speed until the first vehicle passes by the second vehicle, the second set vehicle speed being lower than the first set vehicle speed.

* * * * *